United States Patent [19]
Hirokane et al.

[11] Patent Number: 5,838,645
[45] Date of Patent: Nov. 17, 1998

[54] MAGNETO-OPTICAL RECORDING MEDIUM HAVING A PLURALITY OF MAGNETIC LAYERS

[75] Inventors: Junji Hirokane, Nara; Michinobu Mieda; Junichiro Nakayama, both of Shiki-gun; Akira Takahashi, Nara, all of Japan

[73] Assignee: Sharp Kabushiki Kaisha, Osaka, Japan

[21] Appl. No.: 866,594

[22] Filed: May 30, 1997

Related U.S. Application Data

[62] Division of Ser. No. 595,259, Feb. 1, 1996, Pat. No. 5,684,764.

[30] Foreign Application Priority Data

Mar. 27, 1995 [JP] Japan .................................. 7-68379

[51] Int. Cl.⁶ .................................................. G11B 11/00
[52] U.S. Cl. ................................................. 369/13; 360/59
[58] Field of Search ........................ 369/13, 14; 360/59, 360/114; 365/122; 428/94 ML, 694 MM, 694 EC

[56] References Cited

U.S. PATENT DOCUMENTS

| | | | |
|---|---|---|---|
| 5,432,774 | 7/1995 | Fukumoto et al. | 369/275.4 |
| 5,705,286 | 1/1998 | Hirokane et alf. | 369/13 |
| 5,706,259 | 1/1998 | Fukamachi et al. | 369/13 |
| 5,717,662 | 2/1998 | Nishimura | 369/13 |

FOREIGN PATENT DOCUMENTS

255941/1992  10/1992  Japan .

OTHER PUBLICATIONS

"MSR Disks with Three Magnetic Layers Using In–Plane Magnetization Films" N. Nishimura, et al. Digest of MORIS '94, No. 29–K–04, p. 125, Sep. 27–29, 1994 Tokyo, Japan.

"Magnetically–induced Super Resolution Using Magneto–Static Coupling", K. Tamanoi, et al., Digest of MORIS '94, No. 29–K–05, p. 126, Sep. 27–29, 1994, tokyo, Japan.

"New Readout Technique Using Domain Collapse on Magnetic Multilayer" H. Miyamoto, et al. Digest of MORIS '94, No. 29–K–06, p. 127, Sep. 27–29, 1994, Tokyo Japan.

*Primary Examiner*—Tan Dinh
*Attorney, Agent, or Firm*—David G. Conlin; William J. Daley, Jr.

[57] ABSTRACT

A magneto-optical disk provided with a record layer having a recording magnetic domain where data are recorded, an auxiliary reproduction layer for transferring the record data in the record layer to a reproduction layer by generating a floating magnetic field corresponding to the data in the record layer, and the reproduction layer from which the data are read out through irradiation of a light beam, which are sequentially layered while interposing nonmagnetic intermediate layers therebetween. The stable magnetic domain width in the auxiliary reproduction layer is shorter than the recording magnetic domain width at room temperature and extends as the temperature rises and becomes longer at or above a first temperature. The stable magnetic domain width in the reproduction layer is longer than the recording magnetic domain width at room temperature and lessens as the temperature rises and becomes shorter at or above a second temperature which is lower than the first temperature. The first and second temperatures satisfy a condition expressed as: room temperature<second temperature<first temperature≦maximum temperature in a light beam spot. Accordingly, a reversed magnetic domain is generated and erased instantaneously in the reproduction layer, and a resulting reproduction signal is a rectangular signal, thereby making it possible to provide a magneto-optical optical recording medium capable of reproducing the high-density record data precisely.

7 Claims, 23 Drawing Sheets

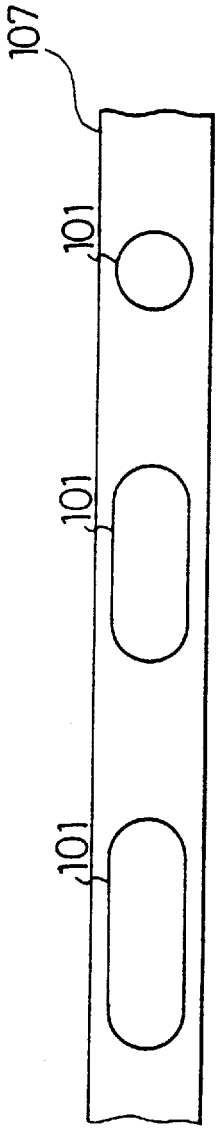
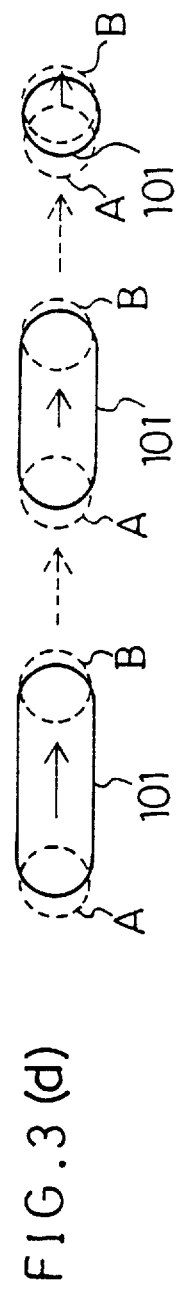
FIG. 3 (a)
FIG. 3 (b)
FIG. 3 (c)
FIG. 3 (d)

↑ DIRECTION OF MAGNETIZATION

↑ DIRECTION OF FLOATING
　MAGNETIC FIELD

↑ DIRECTION OF MAGNETIZATION

↑ DIRECTION OF FLOATING
⋮ MAGNETIC FIELD

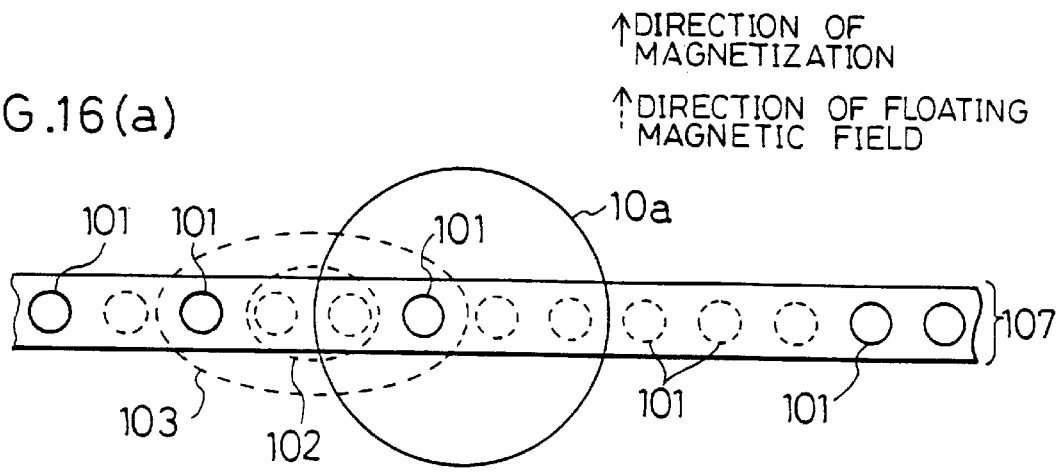
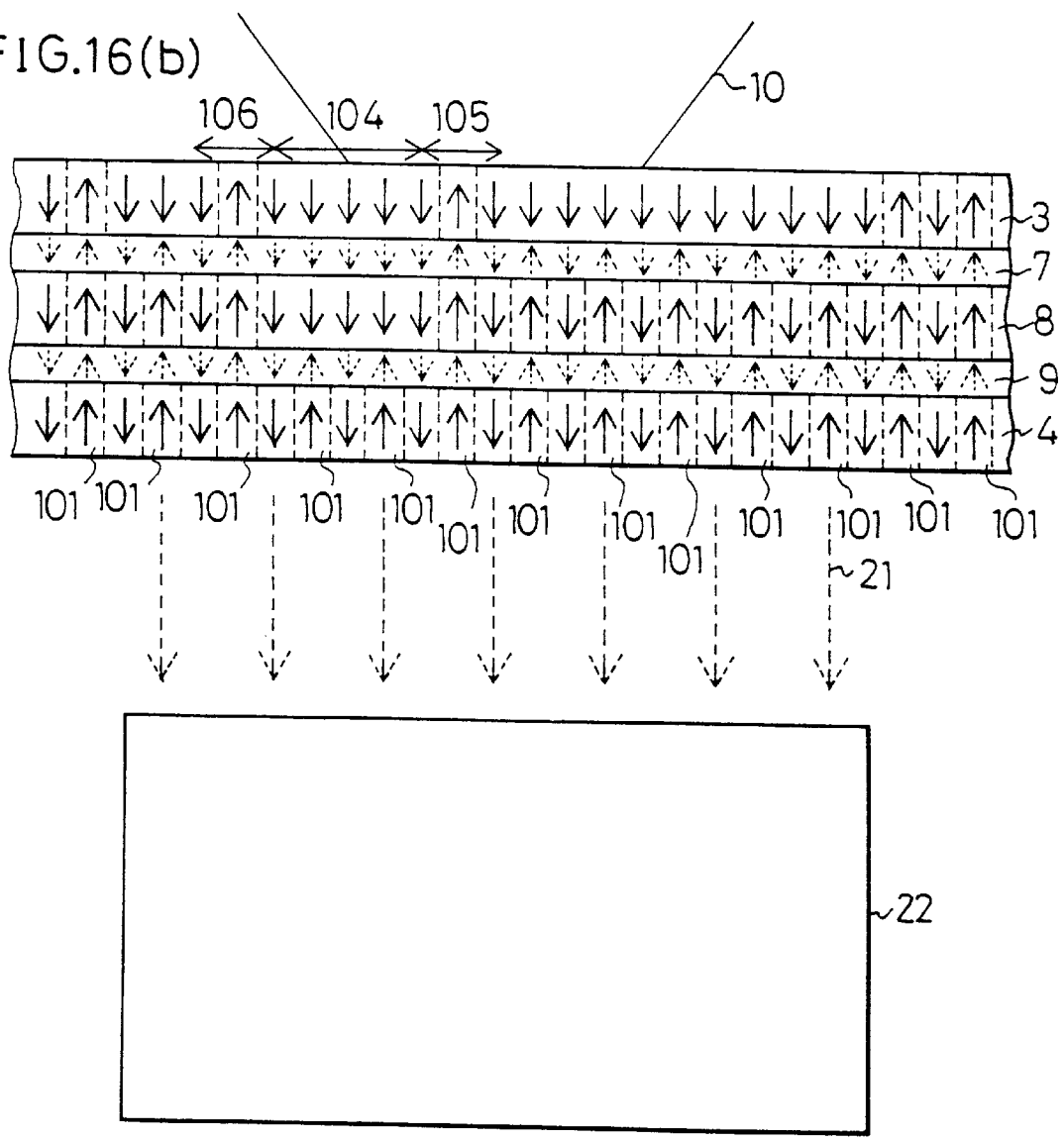

↑ DIRECTION OF MAGNETIZATION

↑ DIRECTION OF FLOATING
  MAGNETIC FIELD

FIG.22(a)
FIG.22(b)
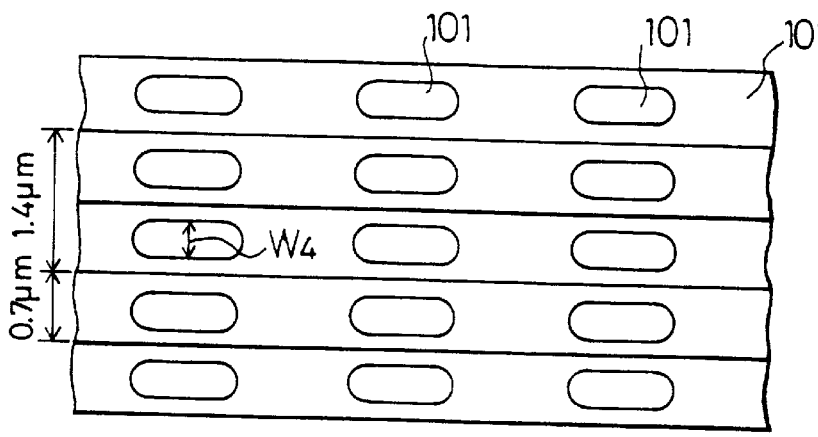
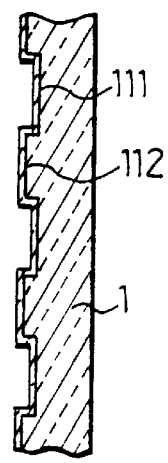
FIG. 23
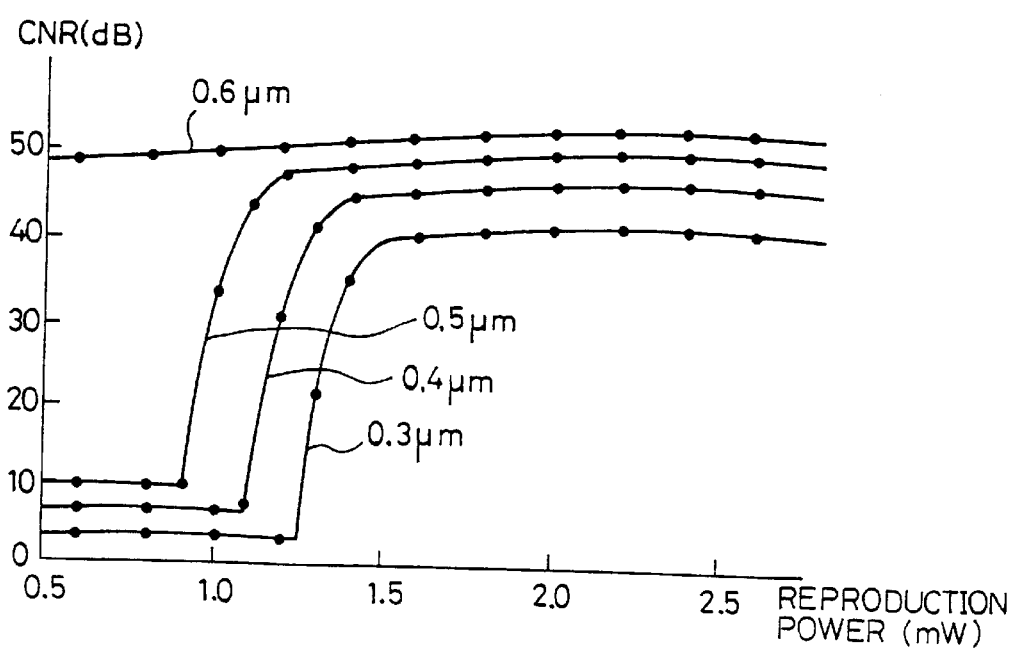

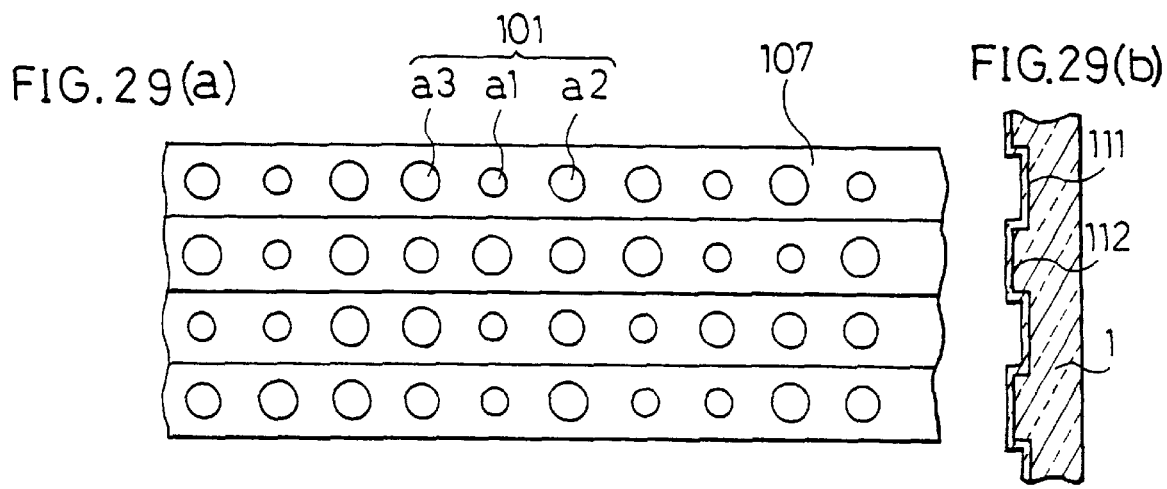
FIG. 29(a)
FIG. 29(b)
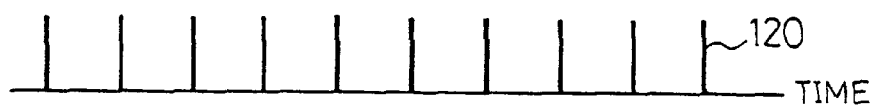
FIG. 29(c)
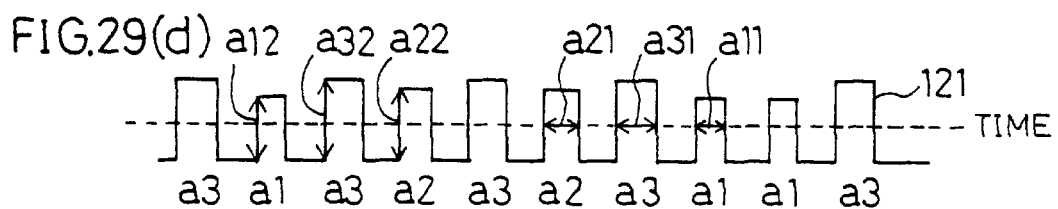
FIG. 29(d)

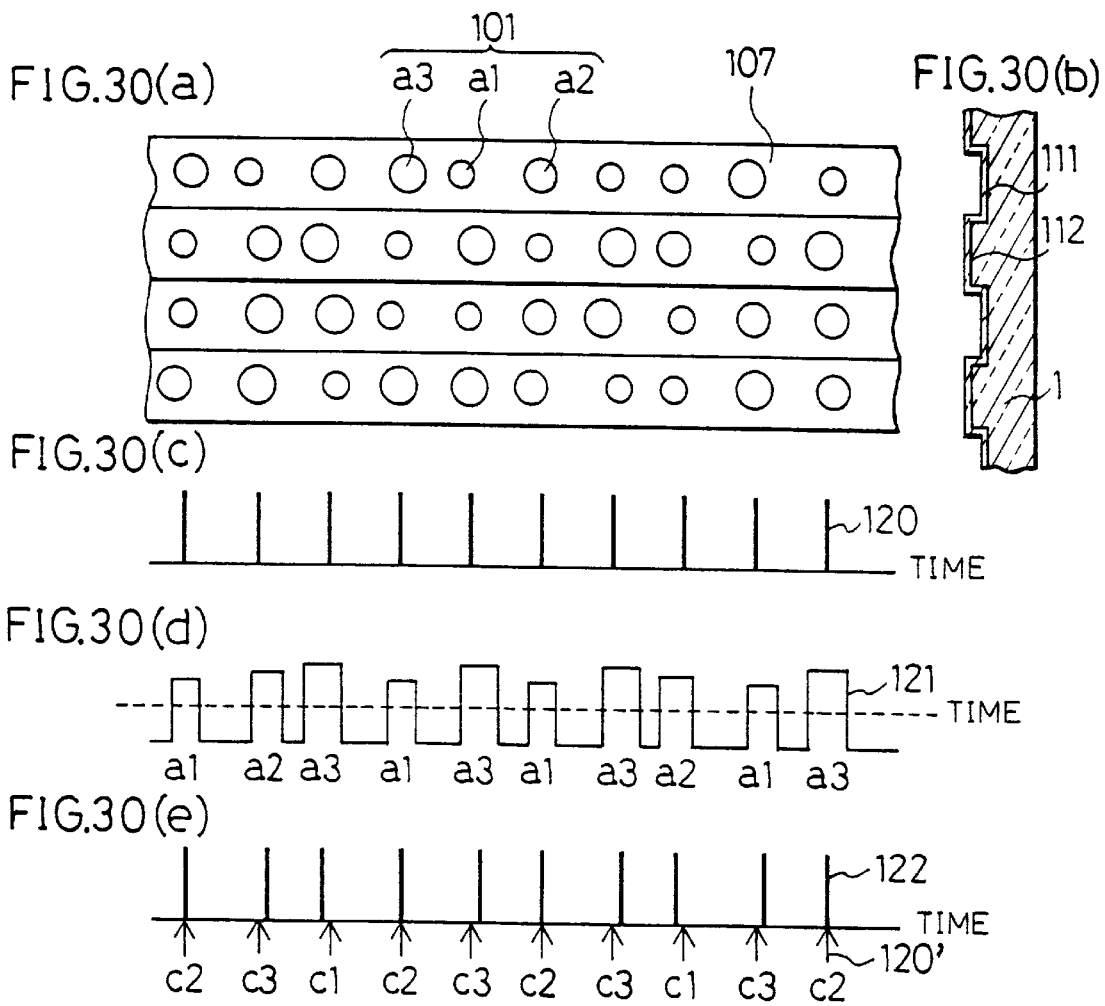

FIG. 31(a)
FIG. 31(b)
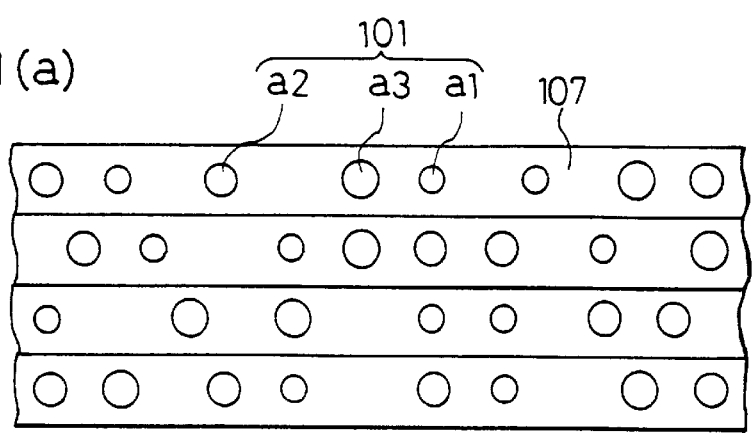
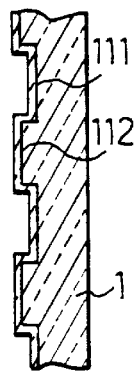
FIG. 31(c)
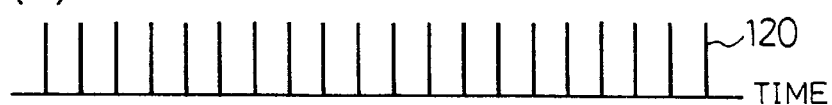
FIG. 31(d)
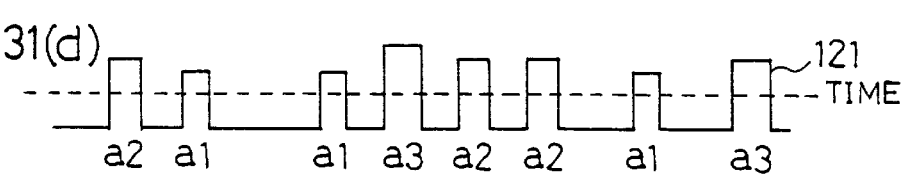
FIG. 31(e)
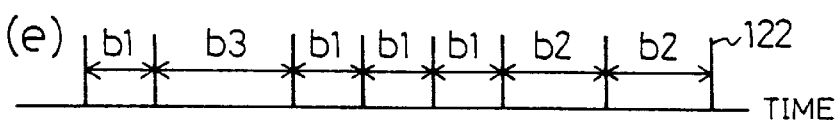

MAGNETO-OPTICAL RECORDING MEDIUM HAVING A PLURALITY OF MAGNETIC LAYERS

This is a divisional of application Ser. No. 08/595,259 filed Feb. 1, 1996, now U.S. Pat. No. 5,684,764, now abandoned.

FIELD OF THE INVENTION

The present invention relates to a magneto-optical recording medium for a magneto-optical recording and reproducing apparatus, such as a magneto-optical disk, magneto-optical tape, and magneto-optical card, and to a recording and reproducing method of the same.

BACKGROUND OF THE INVENTION

Magneto-optical disks have been used as erasable magneto-optical recording media. However, the conventional magneto-optical disks have a problem that the reproduction characteristics deteriorate as a diameter of a recording magnetic domain and intervals (pitches) between the recording magnetic domains become smaller with respect to a diameter of a light beam emitted from a semi-conductor laser and converged on a magneto-optical disk. This is because the converged light beam covers not only an intended recording magnetic domain but also the adjacent one(s), thereby making it impossible to reproduce the data from the recording magnetic domains individually.

To eliminate this drawback and enhance the recording density, structures enabling high resolution reproduction have been proposed. More precisely, the temperature distribution caused by a relative motion of the recording magnetic domain with respect to a reproduction beam spot is known, and a recording magnetic domain is controlled to appear on the magneto-optical recording medium only in a predetermined temperature range during a reproduction process by exploiting such temperature distribution. Japanese Laid-Open Patent Application No. 4-255941 discloses a magneto-optical recording medium comprising a reproduction layer, an auxiliary reproduction layer, and a record layer, and data are read out from a recording magnetic domain as it enters into a reproduction beam spot in a predetermined temperature range where double masks are formed. According to this structure, super resolution reproduction can be realized regardless of the diameter of a beam spot.

Further, some reports on MSR (Magnetically-induced Super Resolution) techniques were presented in the MORIS'94. In page 126 of the proceedings, No. 29-K-05, "Magnetically-Induced Super Resolution Using Magneto-Static Coupling" describes that a front mask and a rear mask with in-plane magnetization are formed by providing a non-magnetic intermediate layer between a reading layer and a writing layer whose magnetization directions are in-plane at room temperature and change to perpendicular with increasing temperature, and there is acknowledged an abrupt signal change due to the rear mask.

Also in page 127 of the proceedings, No. 29-K-06 "New Readout Technique Using Domain Collapse on Magnetic Multilayer" describes that an abrupt signal change caused by the rear mask can yield satisfactory jitter characteristics, and the precise position of the recording magnetic domain can be detected by differentiating a resulting reproduction signal.

Incidentally, there has been an increasing need for magneto-optical recording media of a larger capacity because today's record data are no longer limited to the sound data and include the image data and the like as well.

With the conventional techniques, however, the wave form of a reproduction signal can have an abrupt fall by erasing a magnetic domain from the reproduction layer instantaneously, which is known as a collapse, whereas the wave form has a gradual rise in response to the motion of a light beam. Thus, data related to the precise position can not be detected in the rising portion of the wave form, and as long as the data need be corrected, the record density can not be enhanced.

SUMMARY OF THE INVENTION

It is therefore an object of the present invention to provide a magneto-optical recording medium having a sufficiently large capacity for image data recording and the like by realizing (1) super resolution reproduction regardless of the diameter of a beam spot, and (2) a rectangular reproduction signal having abrupt rise and fall.

To fulfill the above object, a magneto-optical recording medium of the present invention is characterized by comprising:

(a) a record layer, made of a perpendicular magnetization film, for recording data;

(b) a reproduction layer where a light beam is irradiated to read out the data;

(c) an auxiliary reproduction layer, interposed between the record layer and the reproduction layer, for reflecting the data recorded in the record layer; and (d) an intermediate layer, interposed between the auxiliary reproduction layer and reproduction layer, for weakening a magnetic exchange coupling force between the auxiliary reproduction layer and reproduction layer, each of the reproduction layer and the auxiliary reproduction layer being made of a perpendicular magnetization film in which a width of a magnetic domain capable of existing in a stable manner varies in response to temperatures, the magneto-optical recording medium satisfying a condition that the width of a magnetic domain capable of existing in a stable manner in the reproduction layer and the auxiliary reproduction layer is not longer than a width of a magnetic domain in the record layer in a specific temperature range, said temperature range corresponding to a temperature distribution within a part of a spot of said light beam.

The record data in the record layer are reflected on the auxiliary reproduction layer in the above magneto-optical recording medium. Further, since the intermediate layer interposed between the auxiliary reproduction layer and reproduction layer weakens the magnetic exchange coupling force between these two layers, the magnetization direction of the reproduction layer is controlled by floating magnetic fields developed from the auxiliary reproduction layer.

Each of the auxiliary reproduction layer and reproduction layer is made of a perpendicular magnetization film having characteristics that the width of a magnetic domain capable of existing stably is not longer than the magnetic domain width in the recording layer in a predetermined temperature range. The predetermined temperature referred herein corresponds to a temperature distribution within a part of a spot of the light beam irradiated on the reproduction layer. In other words, the data can be transferred from the record layer to the reproduction layer through the auxiliary reproduction layer in an area smaller than the diameter of the light beam spot for reproduction.

Also, at a temperature out of the predetermined range, the magnetic domain either in the auxiliary reproduction layer or reproduction layer can no longer exit in a stable manner and vanishes. In other words, a reversed magnetic domain is generated and erased instantaneously in the reproduction layer, and a resulting reproduction signal has a rectangular wave form with abrupt rise and fall. As a result, the data recorded in the record layer in a diameter or a pitch smaller than the diameter of the light beam spot can be detected and reproduced more precisely, thereby enabling high-density data recording required to increase a capacity. Thus, A magneto-optical recording medium available for image data recording that requires a large-capacity recording and reproduction apparatus.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) through 3(d) are views explaining a reproduction signal reproduced from the magneto-optical recording medium;

FIGS. 16(a) and 16(b) are views explaining another reproduction method of a magneto-optical recording medium;

FIGS. 22(a) and 22(b) are views explaining still another recording method of the mangeto-optical recording medium enabling the reproduction method of FIGS. 17(a) and 17(b);

FIG. 23 is a graph showing the dependency of CNR on a reproduction power in the recording method of FIGS. 22(a) and 22(b);

FIGS. 29(a) through 29(d) show a recording and reproducing method of the magneto-optical recording media of FIGS. 1(a) through 1(d), 11, and 13;

FIGS. 30(a) through 30(e) show another recording and reproducing method of the magneto-optical recording media of FIGS. 1(a) through 1(d), 11, and 13; and FIGS. 31(a) through 31(e) show a further recording and reproducing method of the magneto-optical recording media of FIGS. 1(a) through 1(d), 11, and 13.

DESCRIPTION OF EMBODIMENTS

[FIRST EMBODIMENT]

Referring to FIGS. 1 through 10, the following description will describe an example embodiment in accordance with the present invention.

Figure 1:
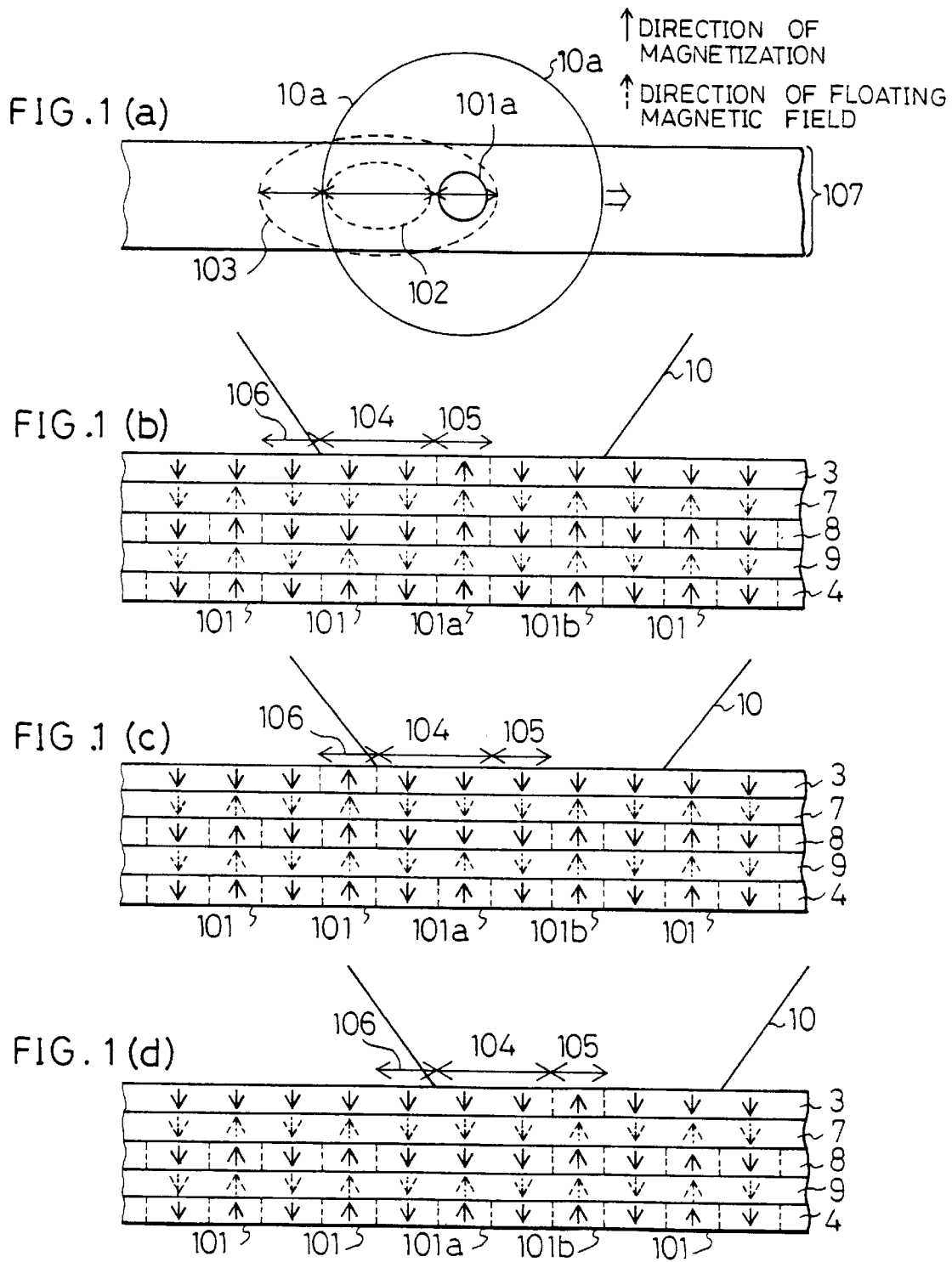
FIGS. 1(a) through 1(d) are views showing an example embodiment in accordance with the present invention, and explaining a reproduction principle of a magneto-optical recording medium.
Figure 2:
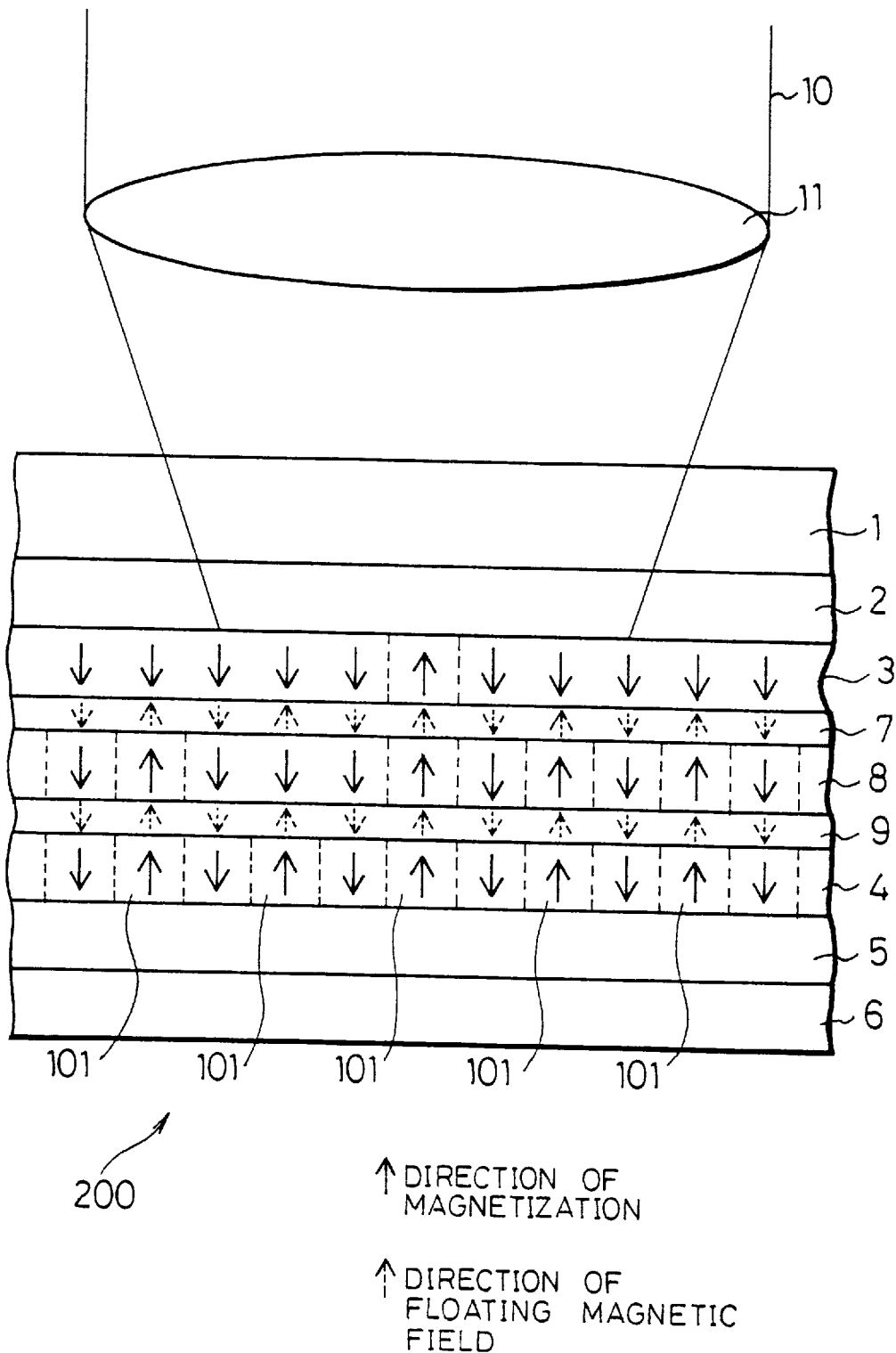
FIG. 2 is a view explaining an example structure of the magneto-optical recording medium.

As shown in FIG. 2, a magneto-optical recording medium of the present embodiment, namely, a magneto-optical disk 200, comprises a substrate 1, a transparent dielectric layer 2, a reproduction layer 3, a non-magnetic intermediate layer 7, an auxiliary reproduction layer 8, a non-magnetic intermediate layer 9, a record layer 4, a protective layer 5, and an overcoat layer 6, which are layered from top to bottom in the drawing. Data are recorded into and reproduced from the magneto-optical disk 200 by focusing a light beam 10 on the reproduction layer 3 through an objective lens 11.

The record layer 4 is a perpendicular magnetization film made of rear-earth transition metal, and includes recording magnetic domains 101 where digital data are recorded.

The auxiliary reproduction layer 8 is a perpendicular magnetization film made of rear-earth transition metal. The auxiliary reproduction layer 8 is provided to prevent floating magnetic fields developed from the record layer 4 from directly acting on the reproduction layer 3, and to control a magnetization direction of the reproduction layer 3 using floating magnetic fields developed from the self. The auxiliary reproduction layer 8 is composed in such a manner that it has a magnetic domain capable of existing stably whose width (hereinafter, referred to as the stable magnetic domain width) is shorter than that of the recording magnetic domain 101 (hereinafter, referred to as the recording magnetic domain width) at room temperature, and the stable magnetic domain width extends gradually as temperature rises and becomes longer than the recording magnetic domain width at a specific temperature, which is referred to as the first temperature and set to 200° C. in the present embodiment.

The reproduction layer 3 is a perpendicular magnetization film made of rear-earth transition metal, to which the magnetization direction corresponding to each recording magnetic domain 101 is transferred through the floating magnetic fields developed from the auxiliary reproduction layer 8 to form a reversed magnetic domain. Contrary to the auxiliary reproduction layer 8, the stable magnetic domain width in the reproduction layer 3 is set to be longer than the recording magnetic domain width at room temperature, and the stable magnetic domain width lessens gradually as the temperature rises and becomes shorter than the recording magnetic domain width at a specific temperature, which is referred to as the second temperature. There is established a relation between the first and second temperatures expressed as:

the first temperature>the second temperature, and the second temperature is set to 100° C. in the present embodiment.

The non-magnetic intermediate layers 7 and 9 are provided to prevent magnetic moments of two magnetic ions between the reproduction layer 3 and auxiliary reproduction layer 8, and the auxiliary reproduction layer 8 and record layer 4, respectively. The magnetic moment means a magnetic coupling force known as magnetic exchange coupling that determines a relative direction of spin. Thus, the magnetization direction of the auxiliary reproduction layer 8 is controlled by the floating magnetic fields developed from the record layer 4 alone, while the magnetization direction of the reproduction layer 3 is controlled by the floating magnetic fields developed from the auxiliary reproduction layer 8 alone.

Next, a reproduction method of the above-structured magneto-optical disk 200 will be explained with reference to FIGS. 1(a) through 1(d). Note that data are generally recorded in the recording magnetic domains 101 formed in the record layer 4 along a plurality of tracks 107 on the substrate 1; however, only one track 107 is shown herein for the conveniences of explanation.

FIG. 1(a) is a top view of the magneto-optical disk 200 and only shows a recording magnetic domain 101a transferred onto the reproduction layer 3 in a reproducible state. The light beam 10 moves along relatively with respect to the track 107 and so does a light beam spot 10a. Thus, there appears a temperature distribution on the magneto-optical disk 200 in response to the motion speed, and a highest-temperature portion always appears behind the light beam spot 10a. In FIG. 1(a), the distribution of the first and second temperatures is indicated by an isothermal line 102 of 200° C. and an isothermal line 103 of 100° C., respectively.

FIG. 1(b) shows the magnetization state of each layer and the states of the floating magnetic fields when the light beam spot 10a is positioned as shown in FIG. 1(a).

More specifically, magnetic domains corresponding to the recording magnetic domains 101 are formed in the auxiliary reproduction layer 8 through the floating magnetic fields developed from the record layer 4. As has been explained, the auxiliary reproduction layer 8 is composed in such a manner that the stable magnetic domain width therein becomes shorter than the recording magnetic domain width in the record layer 4 at room temperature and longer at or above the first temperature. Thus, the stable magnetic domain width in the auxiliary reproduction layer 8 is shorter than the recording magnetic domain width in the record layer 4 where the temperature is lower than the first temperature indicated by the isothermal line 102 (outward from the isothermal line 102). As a result, stable magnetic domains corresponding to the recording magnetic domains 101 are formed in the auxiliary reproduction layer 8.

In contrast, the stable magnetic domain width in the auxiliary reproduction layer 8 is longer than the recording magnetic domain width where the temperature is higher than the first temperature indicated by the isothermal line 102 (inward from the isothermal line 102). Thus, the magnetic domains formed in the auxiliary reproduction layer 8 correspondingly to the recording magnetic domains 101 become unstable and vanish. Since the reversed magnetic domain corresponding to the recording magnetic domain 101 has vanished, the magnetization direction in the auxiliary reproduction layer 8 where the magnetic domain has vanished matches with the magnetization direction of the domains other than the recording magnetic domains 101 in the record layer 4, and the magnetization direction in the corresponding portion in the reproduction layer 3 matches with the magnetization direction of the auxiliary reproduction layer 8.

On the other hand, magnetic domains corresponding to the recording magnetic domains 101 are being formed in the reproduction layer 3 through the floating magnetic fields developed from the auxiliary reproduction layer 8. As has been explained, the stable magnetic domain width is longer than the recording magnetic domain width at room temperature and shorter at or above the second temperature in the reproduction layer 3. Thus, the stable magnetic domain width in the reproduction layer 3 is shorter than the recording magnetic domain width where the temperature is at or above the second temperature indicated by the isothermal line 103 (inward from the isothermal line 103). As a result, stable magnetic domains corresponding to the recording magnetic domains 101 are formed in the reproduction layer 3.

In contrast, the stable magnetic domain width in the reproduction layer 3 is longer than the recording magnetic domain width where the temperature is lower than the second temperature indicated by the isothermal line 103 (outward from the isothermal line 103). As a result, no magnetic domains corresponding to the recording magnetic domains 101 exist in the reproduction layer 3.

Therefore, the data are transferred to the reproduction layer 3 only from the recording magnetic domain 101a of the record layer 4 existing in an area between the isothermal lines 102 and 103 (in a temperature range between 100° C. and 200° C.) through the auxiliary reproduction layer 8. The data thus transferred are detected as a reproduction output and read out by the laser beam 10.

An area denoted by numeral 105 in FIG. 1(b) is a transfer area between the isothermal lines 102 and 103 (a temperature range between 100° C. and 200° C.), and an area denoted by numeral 104 is an erase area inward from the isothermal line 102, namely the high-temperature area exceeding 200° C. Note that the data are also transferred from the record layer 4 to the reproduction layer 3 in an area denoted by numeral 106 between the isothermal lines 102 and 103; however, this area is out of the light beam spot 10a and the data therein are not detected as a reproduction output.

FIG. 1(c) shows the magnetization state of each layer and the states of the floating magnetic fields when the light beam spot 10a moves ahead from the position shown in FIG. 1(b).

The recording magnetic domain 101a in the record layer 4, which existed in the transfer area 105 and the data therein were transferred to the reproduction layer 3 in FIG. 1(b), now exists in the erase area 104. The data that have just read out are erased the instant the stable magnetic domain width in the auxiliary reproduction layer 8 becomes longer than the width of the recording magnetic domain 101a, and so is the reversed magnetic domain in the reproduction layer 3. Thus, existing in the transfer area 105 at this point is a domain of the record layer 4 which records no data, and therefore, no data are detected as a reproduction output.

FIG. 1(d) shows the magnetization state of each layer and the states of the floating magnetic fields when the light beam spot 10a moves ahead from the position shown in FIG. 1(c).

A recording magnetic domain 101b, following the recording magnetic domain 101a in the record layer 4 which existed in the transfer area 105 and the data therein were transferred to the reproduction layer 3 in FIG. 1(b), now exists in the transfer area 105. Thus, the data in the recording magnetic domain 101b are transferred to the reproduction layer 3 as a magnetic domain is formed instantaneously, and the data thus transferred are read out by the light beam 10.

As has been explained, the stable magnetic domain width changes depending on the temperature in the reproduction layer 3 and auxiliary reproduction layer 8 of the magneto-optical disk 200. Thus, although each recording magnetic domain 101 is sufficiently small with respect to the diameter of the beam light spot 10a, the data are transferred to the reproduction layer 3 from only the recording magnetic domain 101 of the record layer 4 existing in the temperature range between the temperatures indicated by the isothermal lines 102 and 103, and reproduced by the light beam 10. Accordingly, the data in each recording magnetic domain 101 can be reproduced by the light beam 10 in a stable and secured manner even when the recording density of the record layer 4 is enhanced to an extent such that required for an apparatus with a sufficient capacity for recording and reproducing image data.

Moreover, the reversed magnetic domain is formed in the reproduction layer 3 the instant the stable magnetic domain width in the reproduction layer 3 becomes shorter than the recording magnetic domain width as the light beam 10 moves ahead and the recording magnetic domain 101 passes by the isothermal line 103. Thus, a resulting reproduction signal has an abrupt rise. Also, the reversed magnetic domain vanishes from the auxiliary reproduction layer 8 the instant the recording magnetic domain 101 passes by the isothermal line 102 and the stable magnetic domain width in the auxiliary reproduction layer 8 becomes longer than the recording magnetic domain width, and so does the reversed magnetic domain in the reproduction layer 3. Thus, a resulting reproduction signal has an abrupt fall.

The wave forms of reproduction signals from the magneto-optical disk 200 and a comparative example, namely, the magneto-optical disk disclosed in the proceedings described in the prior art column were examined, the results of which are set forth in FIG. 3(a) through 3(d).

Three recording magnetic domains 101 having their respective lengths as shown in FIG. 3(a) were reproduced sequentially. The wave form of a reproduction signal from the conventional magneto-optical disk is set forth in FIG. 3(b) and the wave form of a reproduction signal from the magneto-optical disk 200 of the present embodiment is set forth in FIG. 3(c).

In case of the conventional magneto-optical disk, the wave form can have an abrupt fall using instantaneous vanishing of the magnetic domain from the reproduction layer, which is known as a collapse. However, the wave form can not have an abrupt rise but a gradual rise corresponding to the motion of the light beam.

In contrast, in case of the magneto-optical disk 200 of the present embodiment, the magnetic domain appears in and vanishes from the reproduction layer 3 instantaneously by controlling the reproduction characteristics using the reproduction layer 3 and auxiliary reproduction layer 8. Thus, as shown in FIG. 3(d), the reversed magnetic domain appears in the reproduction layer 3 the instant the light beam 10 that moves in the direction indicted by an arrow reaches the top end of each recording magnetic domain 101 indicated by a capital letter A, and vanishes the instant the light beam 10 passes by the bottom end of each recording magnetic domain 101 indicated by a capital letter B. Thus, the wave form of a resulting reproduction signal has abrupt rise and fall as shown in FIG. 3(c).

As has been explained, in case of the magneto-optical disk 200, a magnetic domain is generated and erased in the reproduction layer 3 instantaneously by controlling the reproduction characteristics using the reproduction layer 3 and auxiliary reproduction layer 8, so that a resulting reproduction signal has a rectangular wave form with abrupt rise and fall. Accordingly, not only the position data can be detected more precisely, but also the data can be recorded and reproduced at a higher density compared with the conventional magneto-optical disk.

Next, a manufacturing method of the magnet-optical disk 200 comprising Processes ① through ⑧ will be explained.

Process ①: A disk of polycarbonate substrate 1 having pre-grooves and pre-pits is placed on a substrate holder in a sputter device having an Al target, first and second GdFeCo alloy targets, and a DyFeCo alloy target. Then, after the sputter device is evacuated to $1 \times 10^{-6}$ Torr, a mixed gas of argon and nitrogen is filled therein. Subsequently, power is supplied to the Al target under a gas pressure of $4 \times 10^{-3}$ Torr to form the transparent dielectric layer 2 made of AlN on the substrate 1.

The thickness (film thickness) of the transparent dielectric layer 2 is set to an approximate value found by dividing a quarter of the wave length of a reproduction light beam by the refractive index of the transparent dielectric layer 2 to improve the reproduction characteristics. For example, let the wave length of the reproduction light beam be 680 nm, then the thickness of the transparent dielectric layer 2 is in a range between 10 nm and 80 nm. The transparent dielectric layer 2 of the present embodiment is 50 nm thick.

Process ②: The sputter device is evacuated to $1 \times 10^{-6}$ Torr again. Then, after an argon gas is filled therein, power is supplied to the first GdFeCo alloy target under a gas pressure of $4 \times 10^{-3}$ Torr to form the reproduction layer 3 made of $C_{0.18}(Fe_{0.66}C_{0.34})_{0.82}$ on the transparent dielectric layer 2. The compensation temperature and Curie temperature of the reproduction layer 3 are about room temperature and 420° C., respectively.

A preferable thickness of the reproduction layer 3 is 10 nm or more to prevent magnetization data in the auxiliary reproduction layer 8 from being reproduced as a signal output. Also, it is preferable that the reproduction layer 3 is 100 nm or less thick. Because as the reproduction layer 3 becomes thicker, the light beam 10 demands greater power to raise a temperature, which degrades the recording sensitivity. The reproduction layer 3 of the present embodiment is 40 nm thick.

Process ③: A mixed gas of argon and nitrogen is filled in the sputter device, and power is supplied to the Al target under a gas pressure of $4\times10^{-3}$ Torr to form the nonmagnetic intermediate layer 7 made of AlN on the reproduction layer 3. A preferable thickness of the nonmagnetic layer 7 is 60 nm or less to enable the floating magnetic fields developed from the auxiliary reproduction layer 8 to act on the reproduction layer 3 effectively. It is also preferable that the non-magnetic layer 7 is 1 nm or more thick to eliminate magnetic exchange coupling between the reproduction layer 3 and auxiliary reproduction layer 8. The non-magnetic intermediate layer 7 of the present embodiment is 5 nm thick.

Process ④: Power is supplied to the second GdFeCo alloy target under a gas pressure of $4\times10^{-3}$ Torr to form the auxiliary reproduction layer 8 made of $Gd_{0.31}(Fe_{0.66}Co_{0.34})_{0.69}$ on the non-magnetic intermediate layer 7. The auxiliary reproduction layer 8 is RE-rich at room temperature compared with the compensation composition, and the compensation temperature and Curie temperature thereof are 280° C. and 420° C., respectively. "RE-rich" referred herein means a composition that contains more RE (rear-earth) metal than TM (transition) metal.

A preferable thickness of the auxiliary reproduction layer 8 is 10 nm or more to prevent the floating magnetic fields developed from the record layer 4 from acting on the reproduction layer 3 directly, and to control the magnetization direction of the reproduction layer 3 using the floating magnetic fields developed from the self. It is also preferable that the auxiliary reproduction layer 8 is 100 nm or less thick. Because as the auxiliary reproduction layer 8 becomes thicker, the light beam 10 demands greater power to raise a temperature, which degrades the recording sensitivity. The auxiliary reproduction layer 8 of the present embodiment is 40 nm thick.

Process ⑤: After a mixed gas of argon and nitrogen is filled in the sputter device, power is supplied to the Al target under a gas pressure of $4\times10^{-3}$ Torr to form the nonmagnetic intermediate layer 9. A preferable thickness of the non-magnetic intermediate layer 9 is 60 nm or less to enable the floating magnetic fields developed from the record layer 4 to act on the auxiliary reproduction layer 8 effectively. It is also preferable that the non-magnetic intermediate layer 9 is 1 nm or more thick to eliminate magnetic exchange coupling between the auxiliary reproduction layer 8 and record layer 4. The non-magnetic intermediate layer 9 of the present embodiment is 5 nm thick.

Process ⑥: The sputter device is evacuated to $1\times10^{-6}$ Torr again. Then, after an argon gas is filled in the sputter device, power is supplied to the DyFeCo alloy target under the same condition as forming the reproduction layer 3 to form the record layer 4 made of $Dy_{0.23}(Fe_{0.75}Co_{0.25})_{0.77}$ on the non-magnetic intermediate layer 9. The record layer 4 is a perpendicular magnetization film having the compensation temperature and Curie temperature at about room temperature and 250° C., respectively. The record layer 4 must develop a floating magnetic field that reverses the magnetization direction of the magnetic domain in the auxiliary reproduction layer 8, and thus a preferable thickness of the record layer 4 is 20 nm or more. It is also preferable that the record layer 4 is 100 nm or less thick. Because as the record layer 4 becomes thicker, the light beam 10 demands greater power to raise a temperature, which degrades the recording sensitivity. The record layer 4 of the present embodiment is 40 nm thick.

Process ⑦: After a mixed gas of argon and nitrogen is filled in the sputter device, power is supplied to the Al target under the same condition as forming the transparent dielectric layer 2 to form the protective layer 5 made of AlN on the record layer 4. The protective layer 5 is preferably 5nm or more thick to protect the magnetic layers (the record layer 4, etc.) from erosion, such as oxidation. The protective layer 5 of the present embodiment is 20 nm thick.

Process ⑧: A UV-ray-setting resin or thermo-setting resin is applied on the protective layer 5 by spin coat, and the resin is irradiated by a UV ray or heated to form the overcoat layer 6.

Figure 4:
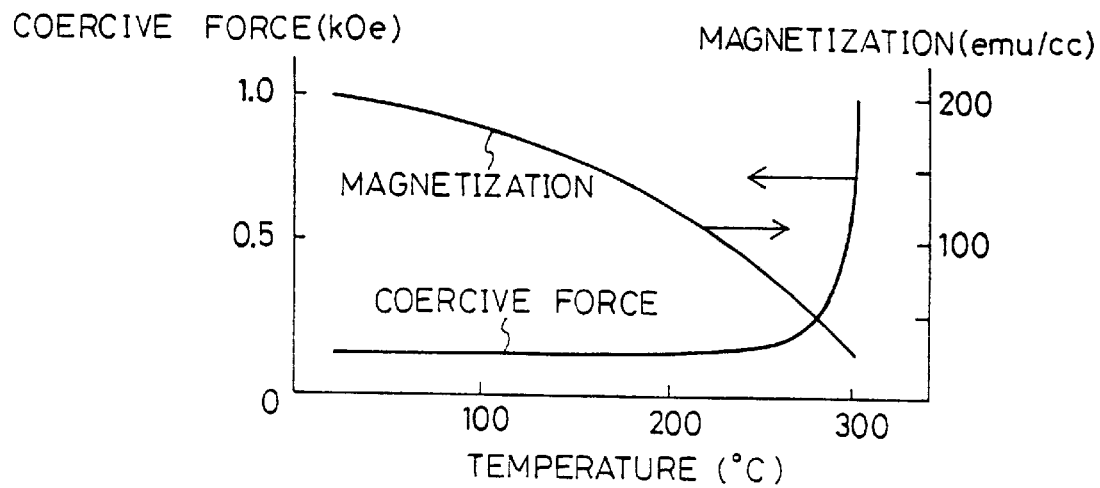
FIG. 4 is a graph showing the dependency of a coercive force and magnetism on temperatures in an auxiliary reproduction layer of the magneto-optical recording medium.

The coercive force and the dependency of magnetization on the temperature in the auxiliary reproduction layer 8 were examined using a sample disk A having only the auxiliary reproduction layer 8 and protective layer 5 both formed by the above-explained processes, the results of which are set forth in FIG. 4. Also, the dependency of the stable magnetic domain width on temperature was examined with the sample disk A, the results of which are set forth in FIG. 5. Likewise, the coercive force and the dependency of magnetization on the temperature in the reproduction layer 3 were examined using a sample disk B having only the reproduction layer 3 and protective layer 5 both formed by the above-explained processes, the results of which are set forth in FIG. 6. Also, the dependency of the stable magnetic domain width on temperature was examined with the sample disk B, the results of which are set forth in FIG. 7. Note that the stable magnetic domain width referred herein is the width of a stripwise magnetic domain that can exist at each temperature in a stable manner.

Figure 5:
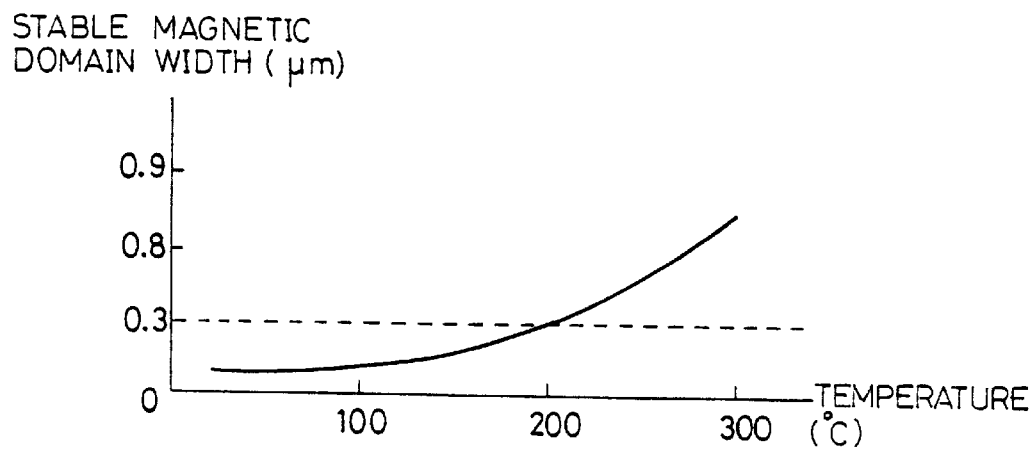
FIG. 5 is a graph showing the dependency of a stable magnetic domain width on temperatures in the auxiliary reproduction layer of the magneto-optical recording medium.

FIG. 4 reveals that the auxiliary reproduction layer 8 has substantially no coercive force at room temperature and it has the compensation point at around 280° C., and the magnetization is degraded as the temperature rises. FIG. 5 reveals that the stable magnetization domain width in the auxiliary reproduction layer 8 becomes longer as the temperature rises, and a 0.3 µm wide magnetic domain that exists in the auxiliary reproduction layer 8 in a stable manner at room temperature becomes unstable above 200° C.

Figure 6:
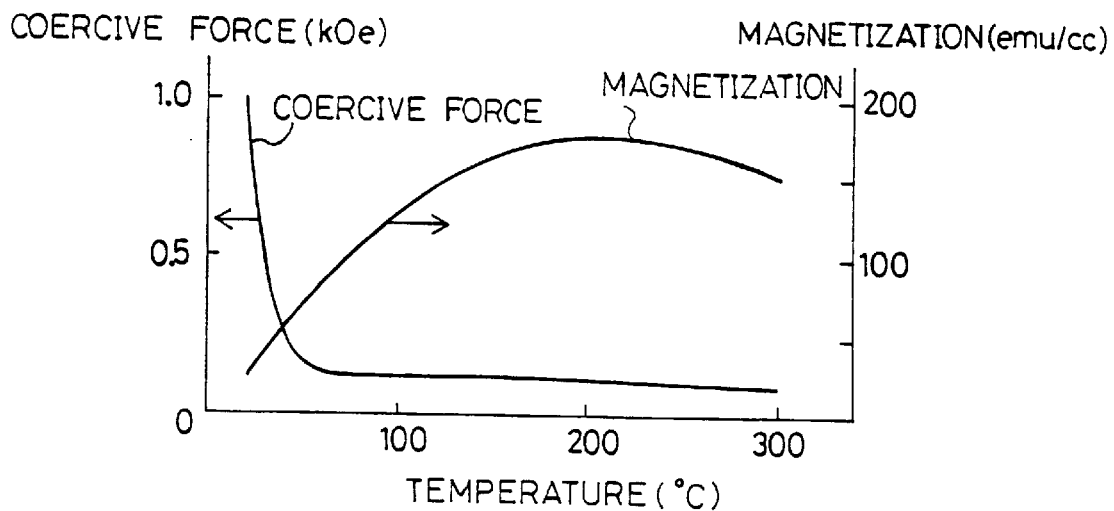
FIG. 6 is a graph showing the dependency of a coercive force and magnetization on temperatures in a reproduction layer of the magneto-optical recording medium.
Figure 7:
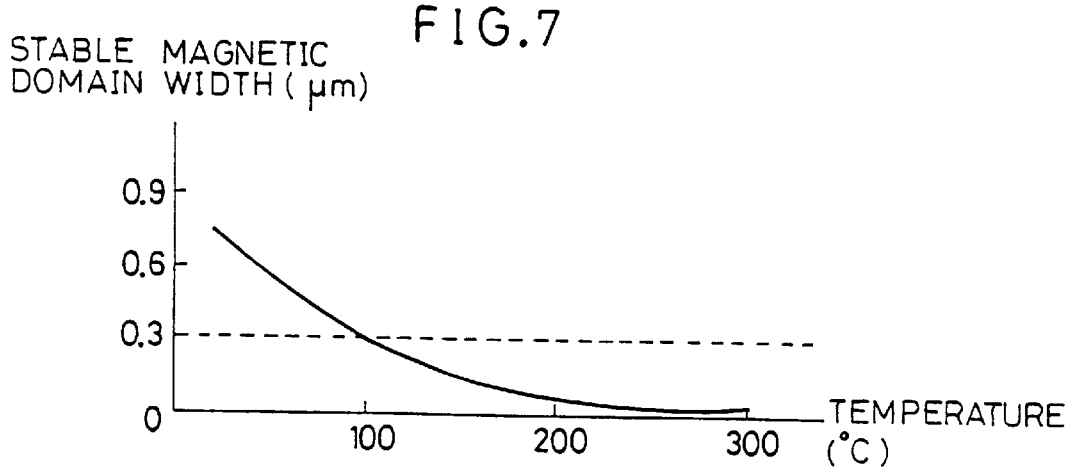
FIG. 7 is a graph showing the dependency of a stable magnetic domain width on temperatures in the reproduction layer of the magneto-optical recording medium.

FIG. 6 reveals that the reproduction layer 3 has the compensation point at room temperature and loses almost all the coercive force above room temperature, and that the magnetization increases as the temperature rises up to around 200° C. and reduces above 200° C. FIG. 7 reveals that the stable magnetic domain width in the reproduction layer 3 becomes shorter as the temperature rises, and a 0.3 µm wide magnetic domain that does not exist in the reproduction layer 3 at room temperature exists in a stable manner at 100° C. or above.

In other words, when the reproduction layer 3 and auxiliary reproduction layer 8 are layered, a 0.3 µm wide magnetic domain can exist stably in the reproduction layer 3 in a temperature range between 100° C. and 200° C. inclusive.

Next, the record and reproduction characteristics of the magneto-optical disk 200 of the present embodiment were examined, which will be described below.

Figure 8:
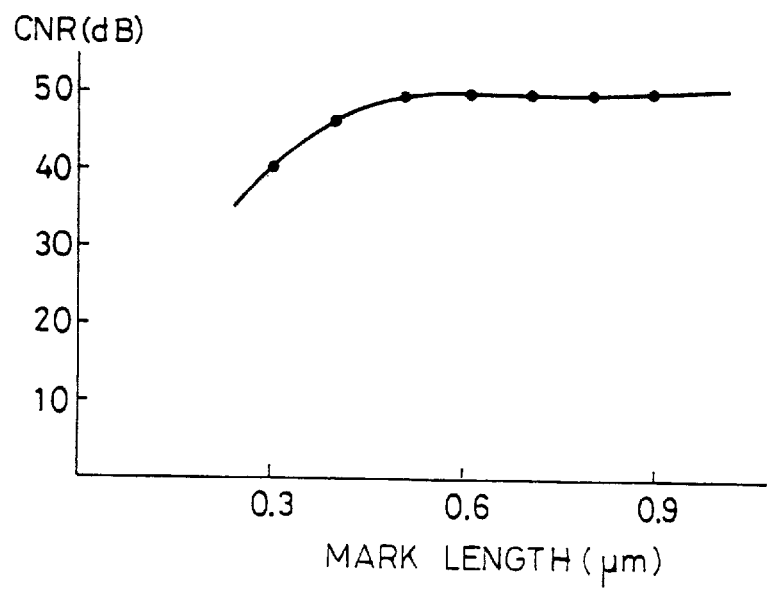
FIG. 8 is a graph showing the dependency of CNR (carrier to noise ratio) on a mark length in the magneto-optical recording medium.

To begin with, the dependency of CNR (carrier to noise ratio) on a mark length was examined, the results of which are set forth in FIG. 8. The CNR was measured in the following procedures:

1) the magnetization directions of the reproduction layer 3, auxiliary reproduction layer 8, and record layer 4 were initialized;
2) a pulse of the light beam 10 of 6 mW was irradiated at a linear velocity of 5 m/s in a recording magnetic field of 10 kA/m;
3) recording magnetic domains 101 having their respective mark lengths were formed in pitches twice as long as their respective mark lengths; and
4) the CNR was measured at a 2 mW reproduction laser power.

The magneto-optical disk 200 could record the data in the record layer 4 in a recording magnetic field as low as 10 kA/m as does a single-layer magneto-optical disk. This is because there exists no magnetic exchange coupling between the reproduction layer 3, auxiliary reproduction layer 8, and record layer 4 due to the non-magnetic intermediate layers 7 and 9 interposed therebetween.

The CNR was measured using a 830 nm wavelength optical system. When reproducing the data from a recording magnetic domain 101 having a mark length of 0.3 μm and a 0.6 μm mark pitch using this optical system, a to-be-reproduced recording magnetic domain 101 recorded in a normal manner can not be distinguished from its adjacent one(s), thereby making the CNR nil. However, as shown in FIG. 8, a CNR of 40 dB was measured when reproducing the recording magnetic domain 101 having a mark length of 0.3 μm and a 0.6 μm mark pitch in the magneto-optical disk 200. The CNR thus measured indicates that the MSR is realized when reproducing the magneto-optical disk 200.

Figure 9:
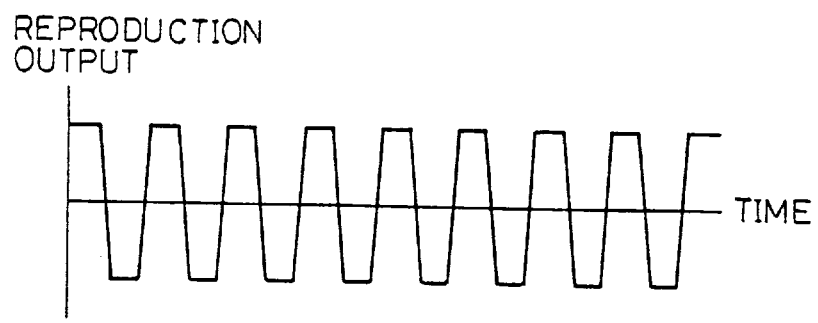
FIG. 9 shows a wave form of a reproduction signal reproduced from the magneto-optical recording medium.

Next, the wave form of a reproduction signal reproduced from the recording magnetic domain 101 having a mark length of 0.3 μm and a 0.6 μm mark pitch was examined, the results of which are set forth in FIG. 9. Unlike the conventional examples, the resulting reproduction signal is characterized by having a rectangular wave form with abrupt rise and fall as shown in FIG. 9.

Figure 10:
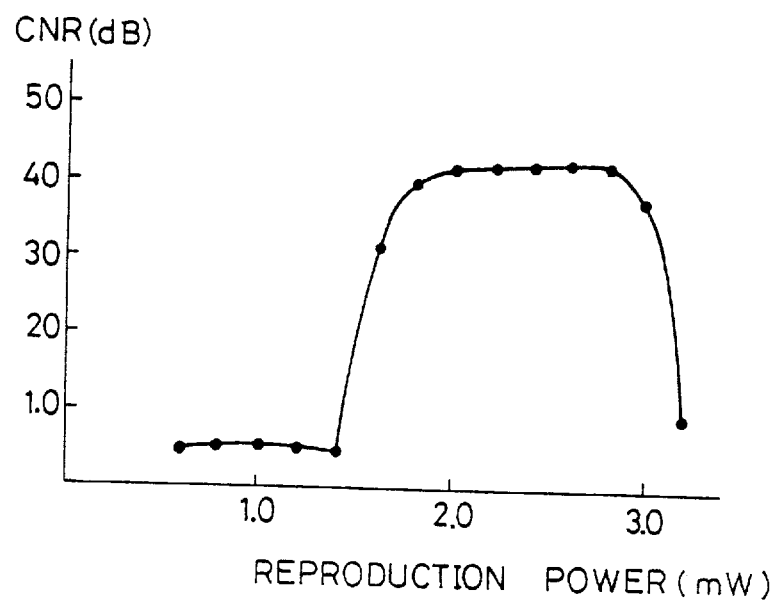
FIG. 10 is a graph showing the dependency of CNR (carrier to noise ratio) on a reproduction power in the magneto-optical recording medium.

Next, the dependency of CNR on the reproduction power was examined, the results of which are set forth in FIG. 10. The CNR was measured in reproducing the data from the recording magnetic domains 101 having a mark length of 0.3 μm and a 0.6 μm mark pitch by varying the reproduction power of the light beam 10.

As shown in FIG. 10, the CNR increases abruptly at some reproduction power. This is because there appears a temperature distribution indicated by the isothermal lines 102 and 103 in FIG. 1(a) as the reproduction power increases, and the reversed magnetic domain develops instantaneously and vanishes (collapses) in the reproduction layer 3. This indicates that, in case of the magneto-optical disk 200, the reproduction power must be greater than the one such that enables the reversed magnetic domain to develop and collapse to generate a satisfactory reproduction signal. Note that the reason why there is some CNR in a low reproduction power region is because the light having passed through the reproduction layer 3 reproduces a signal form the recording magnetic domain 101 in the record layer 4.

The CNR drops abruptly when the reproduction power is further increased. This is because the recording magnetic domain 101 can not be transferred satisfactorily when the temperature of the record layer 4 has risen to around the Curie temperature thereof.

Thus, if a magneto-optical apparatus uses the magneto-optical disk 200, the reproduction power must be greater than the one that can generate and erase the reversed magnetic domain, and smaller than the one that transfers the recording magnetic domain 101 unsatisfactorily.

Next, the CNR in the recording magnetic domain 101 having a mark length of 0.3 μm and a 0.6 μm mark pitch was examined using sample disks 1 through 22 each having the reproduction layer 3, non-magnetic intermediate layer 7, auxiliary reproduction layer 8, non-magnetic intermediate layer 9, and record layer 4 in different thicknesses, the results of which are set forth in TABLE 1 below.

TABLE 1

| SAMPLE | THICKNESS (nm) | | | | | CNR (dB) | REPRODUCTION CHARACTERISTICS |
|---|---|---|---|---|---|---|---|
| | LAYER 3 | LAYER 7 | LAYER 8 | LAYER 9 | LAYER 4 | | |
| 1 | 5 | 5 | 5 | 5 | 40 | — | — |
| 2 | 10 | 5 | 10 | 5 | 40 | 20 | ○ |
| 3 | 20 | 5 | 20 | 5 | 40 | 35 | ○ |
| 4 | 30 | 5 | 30 | 5 | 40 | 39 | ○ |
| 5 | 40 | 5 | 40 | 5 | 40 | 40 | ○ |
| 6 | 50 | 5 | 50 | 5 | 40 | 38 | ○ |
| 7 | 60 | 5 | 60 | 5 | 40 | 34 | ○ |
| 8 | 40 | 1 | 40 | 1 | 40 | 37 | ○ |
| 9 | 40 | 2 | 40 | 2 | 40 | 39 | ○ |
| 10 | 40 | 5 | 40 | 5 | 40 | 40 | ○ |
| 11 | 40 | 10 | 40 | 10 | 40 | 37 | ○ |
| 12 | 40 | 20 | 40 | 20 | 40 | 35 | ○ |
| 13 | 40 | 40 | 40 | 40 | 40 | 32 | ○ |
| 14 | 40 | 60 | 40 | 60 | 40 | 30 | ○ |
| 15 | 40 | 5 | 40 | 5 | 5 | 11 | ○ |
| 16 | 40 | 5 | 40 | 5 | 10 | 23 | ○ |
| 17 | 40 | 5 | 40 | 5 | 20 | 35 | ○ |
| 18 | 40 | 5 | 40 | 5 | 30 | 39 | ○ |
| 19 | 40 | 5 | 40 | 5 | 40 | 40 | ○ |
| 20 | 40 | 5 | 40 | 5 | 60 | 41 | ○ |
| 21 | 40 | 5 | 40 | 5 | 80 | 42 | ○ |
| 22 | 40 | 5 | 40 | 5 | 120 | 42 | ○ |

The CNR was also measured using a 830nm wavelength optical system. The fact that there is acknowledged some CNR in the normally recorded recording magnetic domain 101 having a mark length of 0.3 μm and a 0.6 μm mark pitch indicates that the MSR is realized when the magneto-optical disk 200 is reproduced like the aforementioned case.

In TABLE 1, a mark O in the reproduction characteristics column indicates that the sample disk exhibits the rectangular wave form of the reproduction signal shown in FIG. 3(c), that is to say, the same reproduction characteristics as the magneto-optical disk 200. Although the values of CNR vary, the MSR was acknowledged in all the sample disks except the sample disk 1 having the 5 nm-thick reproduction layer 3 and 5 nm-thick auxiliary reproduction layer 8.

Thus, as has been explained, preferable thicknesses of the above layers are in ranges: between 10 nm and 100 nm inclusive for the reproduction layer 3; between 1 nm and 60 nm inclusive for the non-magnetic intermediate layer 7; between 10 nm and 100 nm for the auxiliary reproduction layer 8; between 1 nm and 60 nm inclusive for the non-magnetic intermediate layer 9; and between 20 nm and 100 nm inclusive for the record layer 4.

Next, the CNR in the recording magnetic domains 101 each having a mark length of 0.3 μm and a 0.6 μm mark pitch was examined using sample disks 23 through 43 having different compositions in the reproduction layer 3 and auxiliary reproduction layer 8, the result of which are set forth in TABLE 2 below. In TABLE 2, X1 and Y1 represent a composition ratio of $Gd_{X1}(Fe_{Y1}Co_{1-Y1})_{1-X1}$ of the reproduction layer 3, while X2 and Y2 represent a composition ratio of $Gd_{X2}(Fe_{Y2}Co_{1-Y2})_{1-X2}$ of the auxiliary reproduction layer 8.

TABLE 2

| SAMPLE | X1 | Y1 | X2 | Y2 | CNR (dB) | REPRODUCTION CHARACTERISTICS |
|---|---|---|---|---|---|---|
| 23 | 0.14 | 0.66 | 0.33 | 0.66 | 0 | — |
| 24 | 0.16 | 0.66 | 0.33 | 0.66 | 33.3 | ○ |
| 25 | 0.18 | 0.66 | 0.33 | 0.66 | 40.8 | ○ |
| 26 | 0.23 | 0.66 | 0.33 | 0.66 | 37.7 | ○ |
| 27 | 0.26 | 0.66 | 0.33 | 0.66 | 0 | — |
| 28 | 0.18 | 0.66 | 0.27 | 0.66 | 0 | — |
| 29 | 0.18 | 0.66 | 0.30 | 0.66 | 32.2 | ○ |
| 30 | 0.18 | 0.66 | 0.33 | 0.66 | 39.7 | ○ |
| 31 | 0.18 | 0.66 | 0.36 | 0.66 | 33.1 | ○ |
| 32 | 0.18 | 0.66 | 0.38 | 0.66 | 0 | — |
| 33 | 0.10 | 0.80 | 0.31 | 0.80 | 0 | — |
| 34 | 0.13 | 0.80 | 0.31 | 0.80 | 24.4 | ○ |
| 35 | 0.15 | 0.80 | 0.31 | 0.80 | 35.7 | ○ |
| 36 | 0.18 | 0.80 | 0.31 | 0.80 | 40.8 | ○ |
| 37 | 0.21 | 0.80 | 0.31 | 0.80 | 27.4 | ○ |
| 38 | 0.23 | 0.80 | 0.31 | 0.80 | 0 | — |
| 39 | 0.18 | 0.80 | 0.26 | 0.80 | 0 | — |
| 40 | 0.18 | 0.80 | 0.28 | 0.80 | 32.1 | ○ |
| 41 | 0.18 | 0.80 | 0.31 | 0.80 | 40.0 | ○ |
| 42 | 0.18 | 0.80 | 0.34 | 0.80 | 38.5 | ○ |
| 43 | 0.18 | 0.80 | 0.37 | 0.80 | 0 | — |

The CNR was also measured using a 830 nm wavelength optical system. The fact that there is acknowledged some CNR in the normally recorded recording magnetic domain 101 having a mark length of 0.3 µm and a 0.6 µm mark pitch indicates that the MSR is realized when reproducing the magneto-optical disk 200 like the aforementioned case.

In TABLE 2, a mark O in the reproduction characteristics column indicates that the sample disk exhibits the rectangular wave form of the reproduction signal shown in FIG. 3(c), namely, the same reproduction characteristics as the magneto-optical disk 200.

TABLE 2 reveals that given Y1=Y2=0.6, then $0.16 \leq X1 \leq 0.23$, and $0.30 \leq X2 \leq 0.36$, respectively, and the reason why is as follows. If X1 is smaller than 0.16, microscopic magnetic domains exist in a stable manner in the reproduction layer 3 at room temperature, thereby making the MSR impossible. If X1 is greater than 0.23, the microscopic magnetic domains in the reproduction layer 3 are not stabilized as the temperature rises in the reproduction layer 3, thereby making the MSR impossible either. Also, if X2 is smaller than 0.30, the microscopic magnetic domains in the auxiliary reproduction layer 8 do not exist in a stable manner at any temperature, thereby making the MSR impossible. If X2 is greater than 0.36, the microscopic magnetic domains in the reproduction layer 3 do not vanish even the temperature of the reproduction layer 3 rises, thereby making the MSR impossible either.

In addition, given Y1=0.80 and Y2=0.80, then $0.13 \leq X1 \leq 0.21$, and $0.28 \leq X2 \leq 0.34$, for the same reason as above. That is to say, the ranges of X1 and X2 vary depending on the values of Y1 and Y2.

The magneto-optical disk 200 of the present embodiment includes the transparent dielectric layer 2 made of AlN; however, the transparent dielectric layer 2 may be a transparent dielectric layer made of SiN, MgO, SiO, TaO, or the like. Note that, however, since a rear-earth transition metal thin film serving as the reproduction layer 3 and record layer 4 is readily oxidized, a transparent dielectric layer 2 made of oxygen-free AlN or SiN is preferred to prevent the oxidation.

Likewise, the reproduction layer 3 of the present embodiment is made of a GdFeCo alloy; however, the reproduction layer 3 may be made of any material as long as the stable magnetic domain width therein changes in response to temperature, for example, a rear-earth transition metal thin film such as a GdFe alloy, a GdDyFe alloy, and a GdDyFeCo alloy are applicable besides the GdFeCo alloy.

Also, the non-magnetic intermediate layers 7 and 9 of the present embodiment are made of AlN; however, any non-magnetic material can serve as the non-magnetic intermediate layers 7 and 9. For example, metal such as Al, Si, Ta, Ti and the like and derivatives such as SiN, SiO, TaO and the like are also applicable besides AlN. Note that, however, like the transparent dielectric layer 2, a non-magnetic intermediate layers 7 and 9 made of oxygen-free Al, Si, Ta, Ti and the like and the derivatives such as oxygen-free SiN and AlN are preferred. Further, a sputtering target can be omitted in forming the non-magnetic intermediate layers 7 and 9 if the non-magnetic intermediate layers 7 and 9 made of Al or AlN is used when the transparent dielectric layer 2 is made of AlN, and if the non-magnetic intermediate layer 7 and 9 made of Si or SiN is used when the transparent dielectric layer 2 is made of SiN.

Also, the record layer 4 of the present embodiment is made of a DyFeCo alloy; however, any material can serve as the record layer 4 as long as it develops a sufficient floating magnetic field to reverse the magnetization of the auxiliary reproduction layer 8 at the time of reproduction. For example, a rear-earth transition metal thin film such as a TbFeCo alloy, a TbDyFeCo alloy, and a GdTbFeCo alloy are also applicable besides the DyFeCo alloy.

[SECOND EMBODIMENT]

Referring to FIGS. 11 and 12 and FIGS. 3 through 10 of the first embodiment, the following description will describe another example embodiment in accordance with the present invention. Hereinafter, like components are labeled with like reference numerals with respect to the first embodiment, and the description of these components is not repeated for the explanation's convenience.

A magneto-optical recording medium of the present embodiment, namely, a magneto-optical disk 300, is of the same structure as the magneto-optical disk 200 of the first embodiment except that an intermediate layer 15 is interposed between the record layer 4 and auxiliary reproduction layer 8 instead of the non-magnetic intermediate layer 9. The intermediate layer 15 is an in-plane magnetization film having the magnetization within the film plane, and composed in such a manner that it has the Curie temperature not higher than the Curie temperature of the record layer 4.

Figure 11:
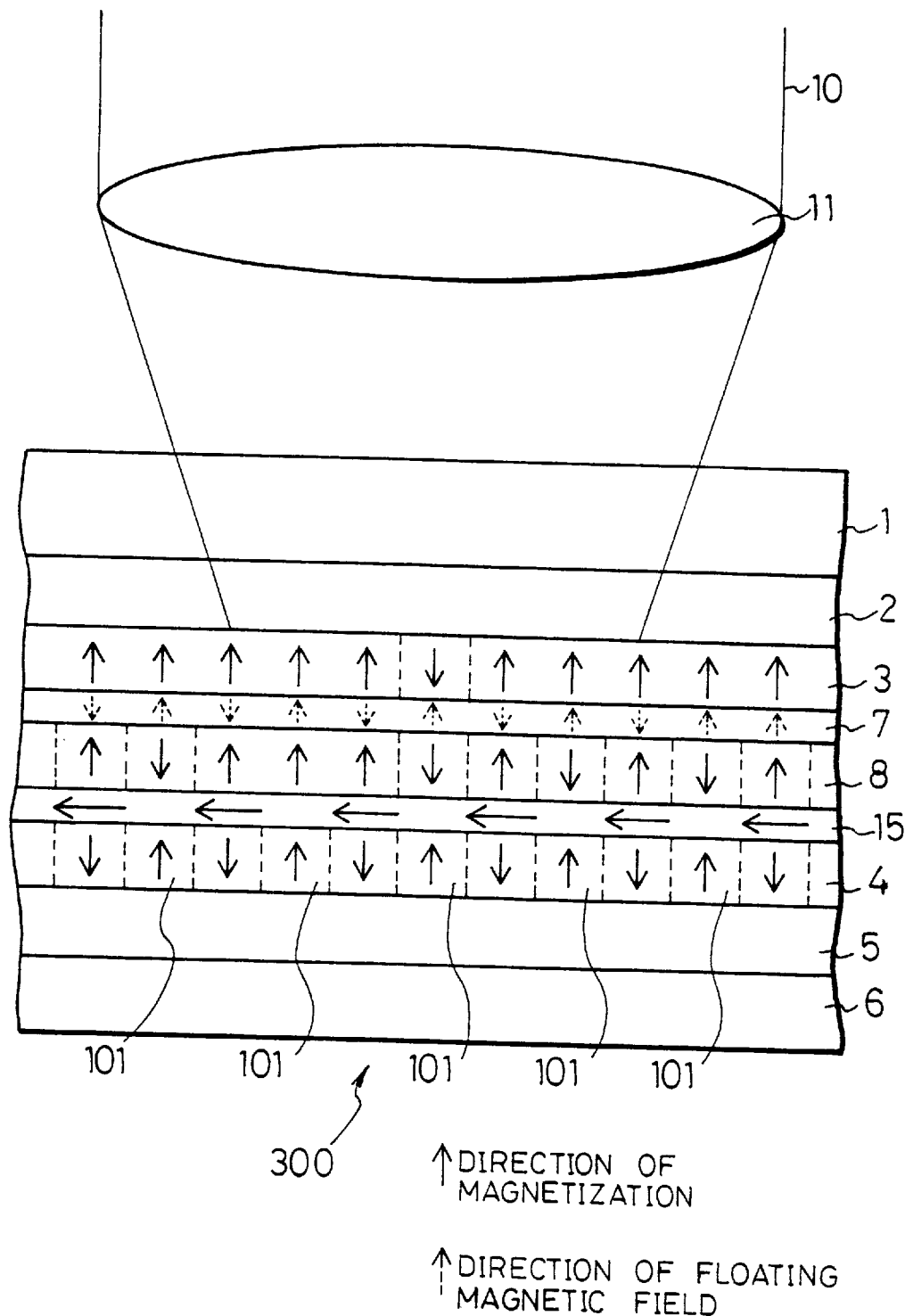
FIG. 11 is a view explaining an example structure of a magneto-optical recording medium in accordance with another example embodiment of the present invention.
Figure 12:
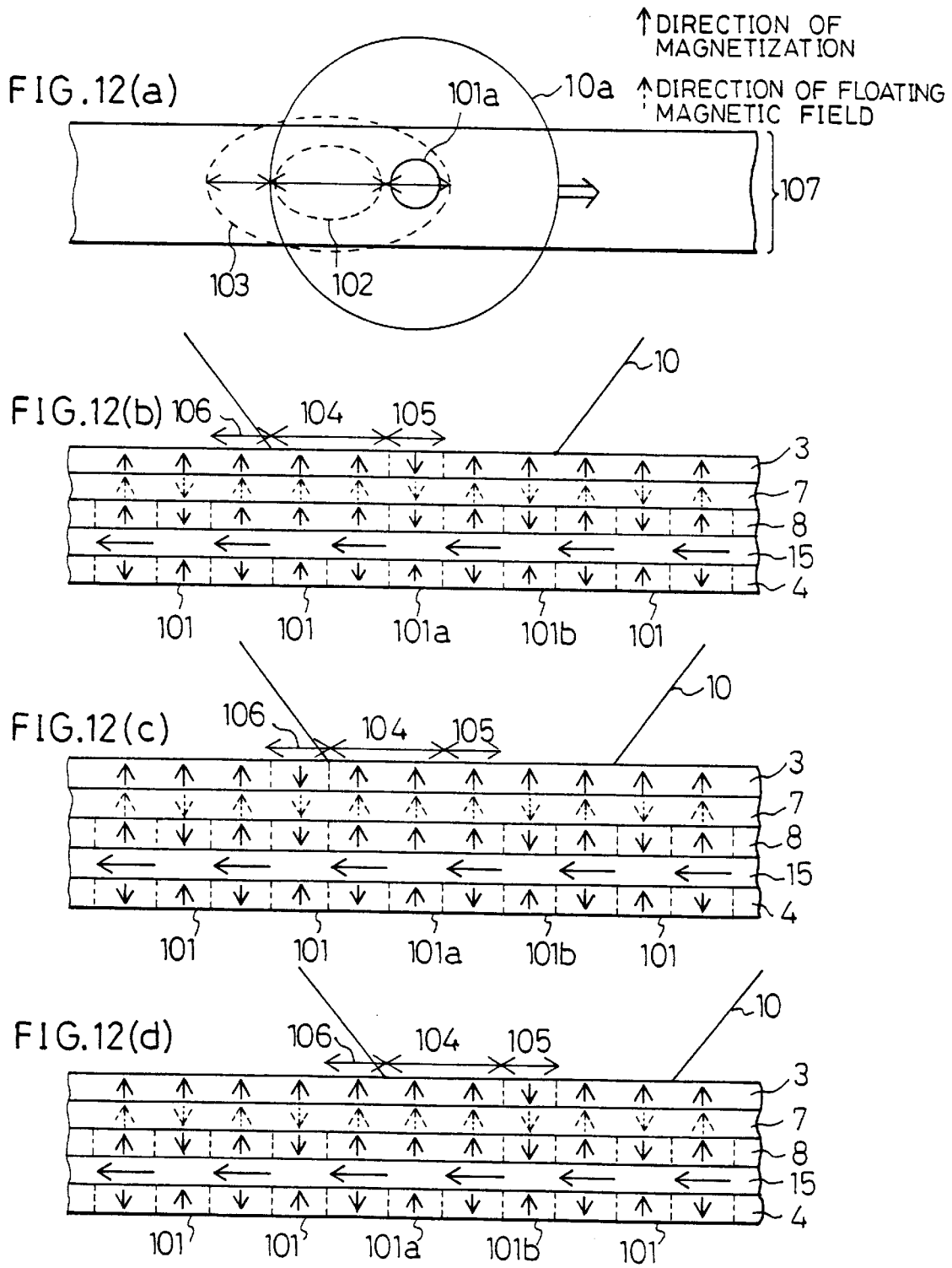
FIGS. 12(a) through 12(d) are views explaining a reproduction principle of the magneto-optical recording medium of FIG. 11.

In case of the magneto-optical disk 300, the recording magnetic domains 101 formed in a smaller pitch than the diameter of the converged light beam 10 is reproduced in the same manner as the magneto-optical disk 200. More precisely, the widths of magnetic domains capable of existing in the reproduction layer 3 and auxiliary reproduction layer 8 are controlled using the temperature distribution caused by the converged light beam 10 to generate and erase the magnetic domain instantaneously, and accordingly, the magnetization direction of the reproduction layer 3 is reversed in response to the floating magnetic field developed from the recording magnetic domain 101 in a part of an area where the light beam 10 is irradiated as shown in FIG. 11.

FIG. 12(a) is a top view of the magneto-optical disk 300, and shows the recording magnetic domain 101a alone which has been transferred to the reproduction layer 3 in a reproducible state. FIGS. 12(b) through 12(d) are views explaining the magnetization state of each layer and the states of the floating magnetic fields in response to the relative motion of the light beam 10. More precisely, FIG. 12(b) shows a state where the recording magnetic domain 101a has been transferred, FIG. 12(c) shows a state where the transferred recording magnetic domain 101a has vanished, and FIG. 12(d) shows a state where a following recording magnetic domain 101b has been transferred. Numerals 105 and 104 in FIG. 12(b) indicate the transfer area and the erase area, respectively.

In an area where the temperature is lower than the one represented by the isothermal line 102, the width of a magnetic domain capable of existing in the auxiliary reproduction layer 8 in a stable manner is shorter than the recording magnetic domain width, and therefore, a magnetic domain corresponding to the recording magnetic domain 101 exists in a stable manner in the auxiliary reproduction layer 8. In contrast, in an area where the temperature is higher than the one represented by the isothermal line 102, the width of a magnetic domain capable of existing in the auxiliary reproduction layer 8 in a stable manner is longer than the recording magnetic domain width, and therefore, a magnetic domain corresponding to the recording magnetic domain 101 in the auxiliary reproduction layer 8 vanishes (erasing area 104). Here, the magnetization direction of the auxiliary reproduction layer 8 in the erasing area 104 matches with a direction determined by the magnetization direction of the areas other than the recording magnetic domains 101 because the reversed magnetic domain to the recording magnetic domain 101 has vanished. As a result, the magnetization direction of the auxiliary reproduction layer 8 in the erase area 104 matches with the magnetization direction of the recording magnetic domain 101, and so does the magnetization direction of the reproduction layer 3 in the erase area 104.

Similarly, in the reproduction layer 3, magnetic domains corresponding to the recording magnetic domains 101 are being formed through the floating magnetic fields developed from the auxiliary reproduction layer 8. However, the width of the magnetic domain capable of existing in the reproduction layer 3 is longer than the recording magnetic domain width in an area where the temperature is lower than the one represented by the isothermal line 103, thereby making it impossible for the magnetic domains corresponding to the recording magnetic domains 101 to exist in the reproduction layer 3. In contrast, in an area where the temperature is higher than the one represented by the isothermal line 103, the width of the magnetic domain capable of existing in the reproduction layer 3 is shorter than the recording magnetic domain width, thereby allowing the magnetic domains corresponding to the recording magnetic domains 101 to exist in the reproduction layer 3.

Thus, the recording magnetic domain 101 is transferred from this record layer 4 to the reproduction layer 3 only in a temperature range between temperatures represented by the isothermal lines 102 and 103 (the transfer area 105).

As has been explained, the stable magnetic domain width changes in the reproduction layer 3 and auxiliary reproduction layer 8 of the magneto-optical disk 300. Thus, although each recording magnetic domain 101 is sufficiently small with respect to the diameter of the beam light spot 10a, the data are transferred to the reproduction layer 3 from only the recording magnetic domain 101 of the record layer 4 existing in the temperature range between the temperatures indicated by the isothermal lines 102 and 103, and reproduced by the light beam 10. Accordingly, the data in each recording magnetic domain 101 can be reproduced by the light beam 10 in a stable and secured manner even when the recording density of the record layer 4 is enhanced to an extent such that required for an apparatus with a sufficient capacity for recording and reproducing image data.

When three recording magnetic domains 101 having different lengths as shown in FIG. 3(a) are sequentially reproduced from the magneto-optical disk 300, the wave form of the resulting reproduction signal has abrupt rise and fall as shown in FIG. 3(c).

That is to say, like the magneto-optical disk 200, a reproduction signal whose wave form is rectangular having abrupt rise and fall is reproduced from the magneto-optical disk 300 by generating and erasing a magnetic domain instantaneously by controlling the reproduction characteristics using the reproduction layer 3 and auxiliary reproduction layer 8. As a result, the position data can be detected more precisely compared with the conventional magneto-optical disk and the data can be recorded and reproduced at a higher density required to record the image data.

Further, since the magneto-optical disk 300 includes the intermediate layer 15 made of an in-plane magnetization film instead of the non-magnetic intermediate layer 9, the magnetization data of the record layer 4 are transferred to the auxiliary reproduction layer 8 more satisfactorily at room temperature compared with a case of the magneto-optical disk 200, thereby ensuring the magnetic domain collapse as the temperature rises.

More precisely, when the intermediate layer 15 made of an in-plane magnetization film is interposed between the record layer 4 and auxiliary reproduction layer 8 as is with the magneto-optical disk 300, the magnetic exchange coupling between the auxiliary reproduction layer 8 and record layer 4 depends on the in-plane magnetization state of the intermediate layer 15, in other words, it is controlled by the intermediate layer 15. For this reason, there exists a magnetic exchange coupling force that tries to align the orientation of the sub-lattice magnetic moment in each layer homogeneously until the temperature of the intermediate layer 15 reaches the Curie temperature. Since the magnetic exchange coupling force is stronger than the magnetic force of the floating magnetic fields, the magnetization data are transferred from the record layer 4 to the auxiliary reproduction layer 8 more satisfactorily in the magneto-optical disk 300 compared with the magneto-optical disk 200, thereby further ensuring the appearance and collapse of the magnetic domain corresponding to the recording magnetic domain 101 in the reproduction layer 3.

Since the intermediate layer 15 has the Curie temperature not higher than the Curie temperature of the record layer 4, the exchange coupling force between the auxiliary reproduction layer 8 and record layer 4 is reduced gradually, and the collapse of the magnetic domain in response to the temperature rise can be further ensured compared with cases where the Curie temperature of the intermediate layer 15 is higher than Curie temperature of the record layer 4.

In case of the magneto-optical disk 200 having the nonmagnetic intermediate layer 9 between the record layer 4 and auxiliary reproduction layer 8, there exists no magnetic exchange coupling force between the auxiliary reproduction layer 8 and record layer 4. This is the reason why the auxiliary reproduction layer 8 that realizes the magnetic domain collapse is RE-rich, containing less transition metal (TM) than rear-earth metal (RE), at room temperature compared with the compensation composition. Therefore, even if the record layer 4 is TM-rich, the magnetization direction of the auxiliary reproduction layer 8 at room temperature matches with the magnetization direction of the floating magnetic fields developed from the record layer 4, and hence, the magnetization direction of the record layer 4 matches with the magnetization direction of the auxiliary reproduction layer 8 (refer to FIGS. 1(b) through 1(d)).

On the contrary, in case of the magneto-optical disk 300 having the intermediate layer 15 made of an in-plane magnetization film, there exists a magnetic exchange coupling force between the auxiliary reproduction layer 8 and record layer 4. This is the reason why the auxiliary reproduction layer 8 that realizes the magnetic domain collapse as the temperature rises through irradiation of the light beam 10 is RE-rich at room temperature compared with the compensation composition. Thus, if the record layer 4 is TM-rich, the magnetization directions of the record layer 4 and auxiliary reproduction layer 8 are opposite to each other as shown in FIGS. 12(b) through (d).

The floating magnetic fields acting on the reproduction layer 3 are developed from the auxiliary reproduction layer 8 and record layer 4, and it is preferable that the auxiliary reproduction layer 8 and record layer 4 have the same magnetization direction like the first embodiment where the magneto-optical disk includes the non-magnetic intermediate layer 9. However, it is the floating magnetic fields developed from the closer of the two layers, namely, the auxiliary reproduction layer 8, that affect the reproduction layer 3 more, and there is no inconvenience if the magnetization directions of the auxiliary reproduction layer 8 and record layer 4 are opposite to each other like the magneto-optical disk 300 including the intermediate layer 15 made of an in-plane magnetization film.

Next, an example producing method of the magneto-optical disk 300 will be explained.

Processes ① through ④ are carried out in the same manner as the first embodiment within a sputter device having an Al target, first, second and third GdFeCo alloy targets, a DyFeCo alloy target to form the transparent dielectric layer 2, reproduction layer 3, non-magnetic intermediate layer 7, and auxiliary reproduction layer 8 which are sequentially layered on the substrate 1. The reproduction layer 3 and auxiliary reproduction layer 8 have the same composition as their counterparts in the magneto-optical disk 200, and each layer is of the same thickness as their respective counterparts of the magneto-optical disk 200.

Next, power is supplied to the third GdFeCo alloy target; under a gas pressure of $4\times10^{-3}$ Torr to form the intermediate layer 15 made of $Gd_{0.40}(Fe_{0.66}Co_{0.34})_{0.60}$ on the auxiliary reproduction layer 8. The intermediate layer 15 is an in-plane magnetization film maintaining the in-plane magnetization below the Curie temperature. The intermediate layer 15 must be of a thickness such that enables the magnetic exchange coupling between the record layer 4 and auxiliary reproduction layer 8 at room temperature and the collapse of the reversed magnetic domain in the auxiliary reproduction layer 8 as the temperature rises. Thus, an intermediate layer 15 of 3 nm or more thick is preferable Also, if the intermediate layer 15 is thick more than necessary, the magnetic exchange coupling between the record layer 4 and auxiliary reproduction layer 8 at room temperature becomes insufficient, which makes the transfer state of the magnetic domain in the reproduction layer 8 unstable at room temperature. Thus, it is also preferable for the intermediate layer 15 to have the thickness of 50 nm or less. The intermediate layer 15 of the present embodiment is 10 nm thick.

Next, Processes ⑥ through ⑧ are carried out in the same manner as the first embodiment to form the record layer 4, protective layer 5, and overcoat layer 6 sequentially on the intermediate layer 15. The record layer 4 has the same composition as its counterpart of the magneto-optical disk 200. Also, each layer is of the same thickness as their counterparts in the magneto-optical disk 200.

The dependency of the stable magnetic domain width in the reproduction layer 3 and auxiliary reproduction layer 8 on the temperature were examined and the results of which were substantially the same as those obtained in the first embodiment. Judging from FIGS. 5 and 7, it is understood that the reproduction layer 3, in which a magnetic domain of 0.3 μm wide can exist stably in a temperature range between 100° C. and 200° C. inclusive, can be produced.

Next, the record and reproduction characteristics of the magneto-optical disk 300 were examined in the same manner as the magneto-optical disk 200, and the results of which were substantially the same as those shown in FIG. 8. In other words, the both disks exhibit substantially the same dependency of CNR on the mark length. Note that the magneto-optical disk 300, in which the magnetic exchange coupling between the reproduction layer 3, auxiliary reproduction layer 8, and the record layer 4 is controlled, demands a considerably large recording magnetic field compared with the magneto-optical disk 200; however, the data could be recorded in a recording magnetic field as low as 15 kA/m.

Further, the wave form of a reproduction signal from the magnetic domain having the mark length of 0.3 μm and a 0.6 μm mark pitch in the magneto-optical disk 300 is substantially the same as the wave form of the magneto-optical disk 200 shown in FIG. 9, namely, the characteristical rectangular wave form.

The dependency of CNR on the reproduction power was also examined, and the results of which were substantially the same as those shown in FIG. 10 of the magneto-optical disk 200. That is to say, there is acknowledged characteristics that the CNR increases abruptly at some reproduction power.

The dependency on the film thickness of the magneto-optical disk 300 was examined in the same manner as the magneto-optical disk 200 using sample disks each comprising the reproduction layer 3, non-magnetic intermediate layer 7, auxiliary reproduction layer 8, intermediate layer 15, and record layer 4 with different thicknesses, and the results of which were substantially the same as those of the magneto-optical disk 200 except the intermediate layer 15 made of an in-plain magnetization film. As has been explained, an intermediate layer 15 of not more than 3nm and not less than 50 nm thick is preferred to realize the exchange coupling satisfactorily. The same results were obtained as to the examination on the composition of the reproduction layer 3 and auxiliary reproduction layer 8. The composition of the intermediate layer 15 made of an in-plain magnetization film is not especially limited as long as than magnetization direction can exist within the plane thereof and the exchange coupling between the auxiliary reproduction layer 8 and record layer 4 can be realized satisfactorily.

The same can be said with the magneto-optical disk 300 and magneto-optical disk 200 as to the materials of the transparent dielectric layer 2, reproduction layer 3, nonmagnetic intermediate layer 7, and record layer 4.

Also, the in-plane magnetization film serving as the intermediate layer 15 herein is made of GdFeCo; however, the intermediate layer 15 may be made of any material having its magnetization direction within the plane thereof, such as GdFe, GdCo, and FeCo.

[THIRD EMBODIMENT]

Referring to FIGS. 13 and 14 and FIGS. 3 through 10 of the first embodiment, the following description will describe another example embodiment in accordance with the present: invention. Hereinafter, like components are labeled with like reference numerals with respect to the above embodiments, and the description of these components is not repeated for the explanation's convenience.

Figure 13:
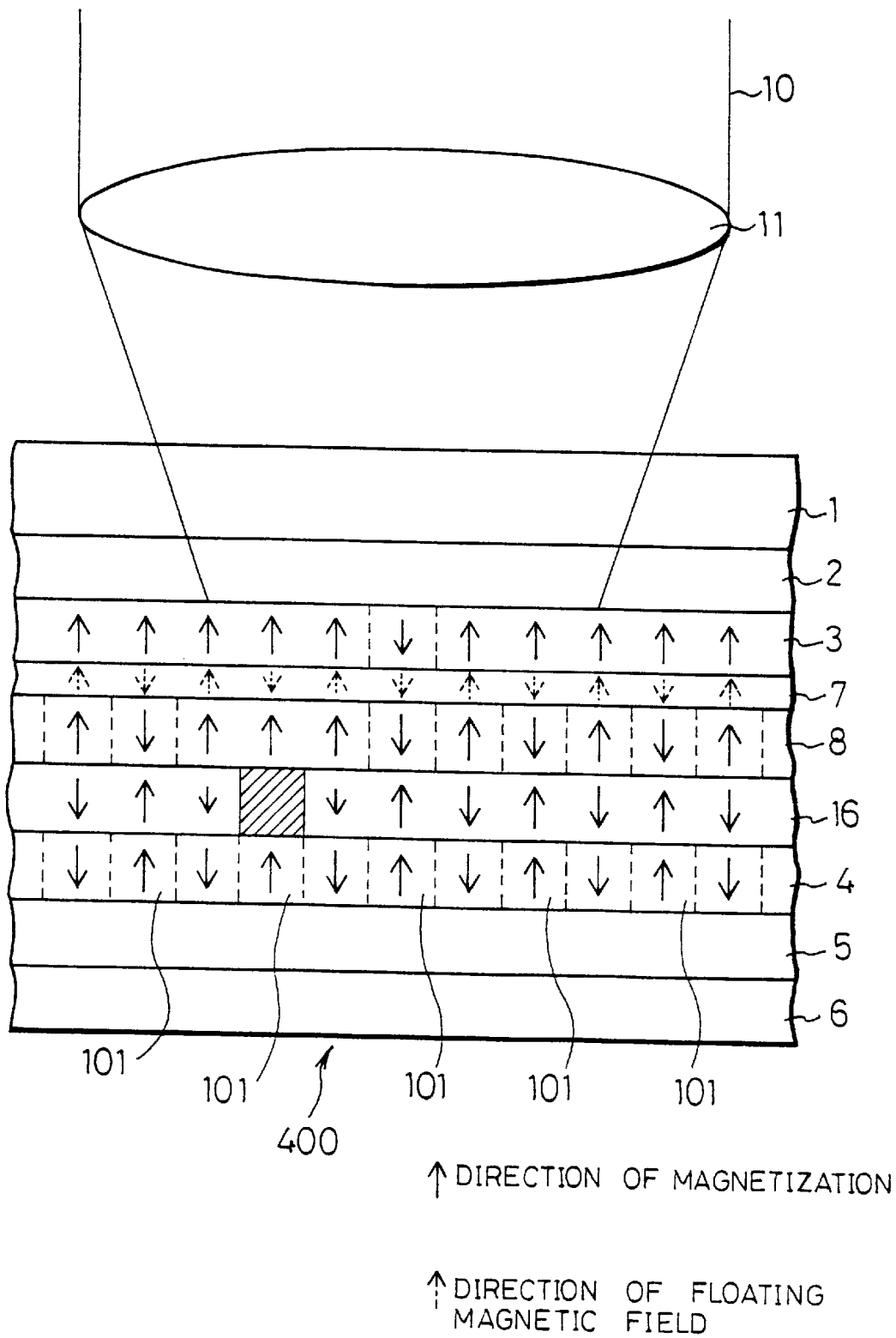
FIG. 13 is a view explaining an example structure of a magneto-optical recording medium of a further example embodiment in accordance with the present invention.

As shown in FIG. 13, a magneto-optical recording medium of the present embodiment, namely a magneto-optical disk 400, is of the same structure as the magneto-optical disk 200 except that an intermediate layer 16 made of a perpencicular magnetization film is interposed between the record layer 4 and auxiliary reproduction layer 8 instead of the non-magnetic intermediate layer 9. The intermediate layer 16 is composed in such a manner that it has the Curie temperature lower than those of the record layer 4 and auxiliary reproduction layer 8.

In case of the magneto-optical disk 400, the recording magnetic domains 101 formed in a smaller pitch than the diameter of the converged light beam 10 is reproduced in the same manner as the magneto-optical disk 200. More precisely, the widths of magnetic domains capable of existing in the reproduction layer 3 and auxiliary reproduction layer 8 are controlled using the temperature distribution caused by the converged light beam 10 to generate and erase the magnetic domain instantaneously, and the magnetization direction of the reproduction layer 3 is reversed in response to the floating magnetic field developed from the recording magnetic domain 101 in a part of an area where the light beam 10 is irradiated as shown in FIG. 13.

Figure 14A:
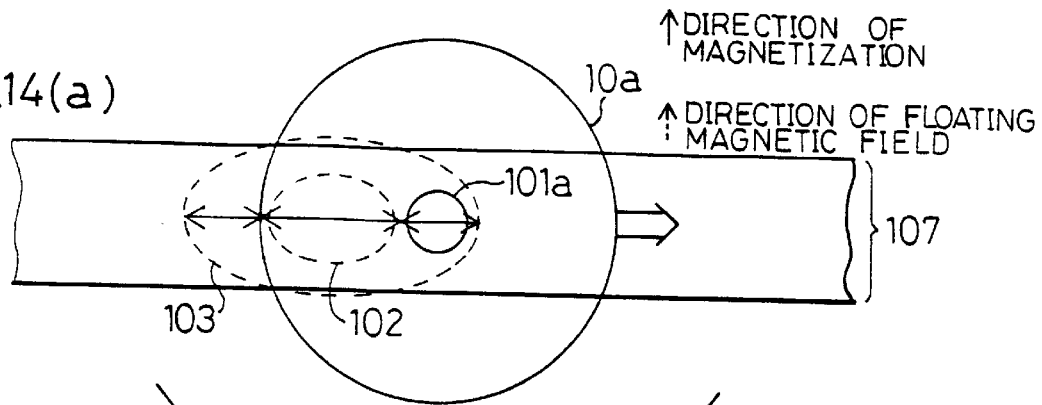
FIGS. 14(a) through 14(d) are views explaining a reproduction principle of the magneto-optical recording medium of FIG. 13.
Figure 14B:
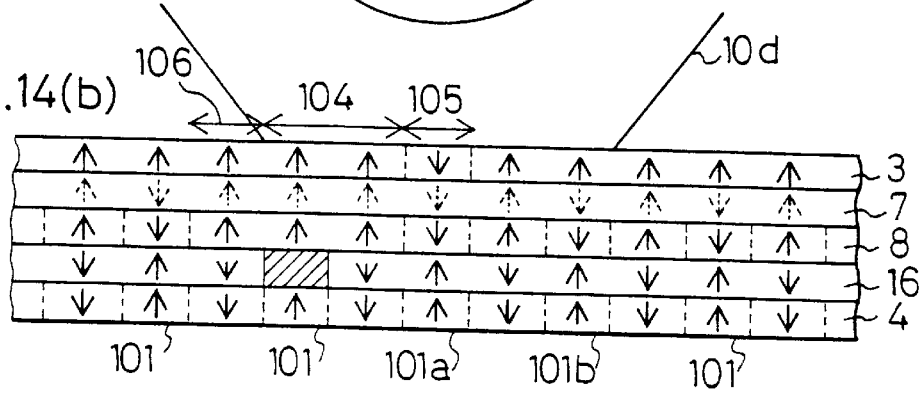
Figure 14C:
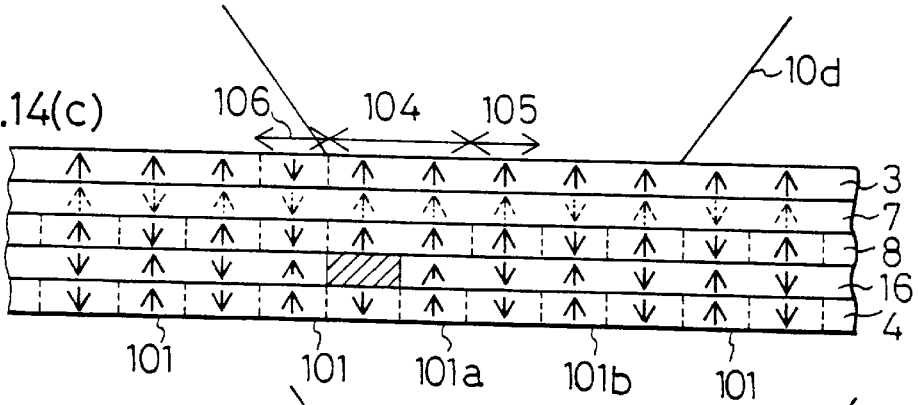
Figure 14D:
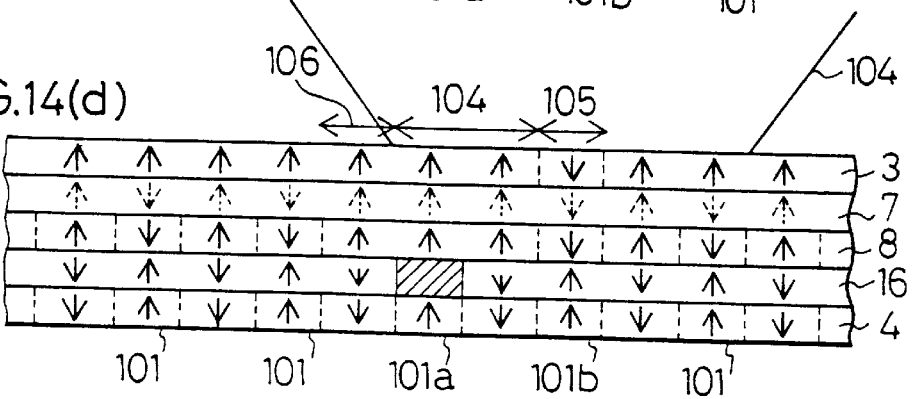

FIG. 14(a) is a top view of the magneto-optical disk 400, and shows the recording magnetic domain 101a alone which has been transferred in a reproducible state. FIGS. 14(b) through 14(d) are views explaining the magnetization state of each layer in response to the relative motion of the light beam 10 and the states of the floating magnetic fields. More precisely, FIG. 14(b) shows a state where the recording magnetic domain 101a has been transferred, FIG. 14(c) shows a state where the transferred recording magnetic domain 101a has vanished, and FIG. 14(d) shows a state where a following recording magnetic domain 101b has been transferred.

Numerals 105 and 104 in FIG. 14(b) indicate the transfer area and the erase area, respectively.

In an area where the temperature is lower than the one represented by the isothermal line 102, the width of a magnetic domain capable of existing in the auxiliary reproduction layer 8 in a stable manner is shorter than the recording magnetic domain width, and therefore, a magnetic domain corresponding to the recording magnetic domain 101 exists in a stable manner in the auxiliary reproduction layer 8. In contrast, in an area where the temperature is higher than the one represented by the isothermal line 102, the width of a magnetic domain capable of existing in the auxiliary reproduction layer 8 in a stable manner becomes longer than the recording magnetic domain width, and therefore, a magnetic domain corresponding to the recording magnetic domain 101 in the auxiliary reproduction layer 8 vanishes (erasing area 104). Here, the magnetization direction of the auxiliary reproduction layer 8 in the erasing area 104 matches with a direction determined by the magnetization of the domains other than the recording magnetic domains 101 because the reversed magnetic domain to the recording magnetic domain 101 has vanished. Thus, the magnetization direction of the auxiliary reproduction layer 8 matches with that of the magnetic domain 101 in the erase area 104, and so does the magnetization direction of the reproduction layer 3.

In the reproduction layer 3, magnetic domains corresponding to the recording magnetic domains 101 are being formed through the floating magnetic fields developed from the auxiliary reproduction layer 8. However, in an area where the temperature is lower than the one represented by the isothermal line 103, the width of the magnetic domain capable of existing stably in the reproduction layer 3 is longer than the recording magnetic domain width, thereby making it impossible for the magnetic domain corresponding to the recording magnetic domain 101 to exist in the reproduction layer 3. In contrast, in an area where the temperature is higher than the one represented by the isothermal line 103, the width of the magnetic domain capable of existing stably in the reproduction layer 3 is shorter than the recording magnetic domain width, thereby allowing the magnetic domain corresponding to the recording magnetic domain 101 to exist in the reproduction layer 3.

Thus, the recording magnetic domain 101 is transferred from the record layer 4 to the reproduction layer 3 only in a temperature range between temperatures represented by the isothermal lines 102 and 103 (transfer area 105).

As has been explained, the stable magnetic domain width also varies in response to a change in temperature in the magneto-optical disk 400 of the present embodiment. Thus, only the data in the recording magnetic domain 101 in the record layer 4, which is sufficiently smaller with respect to the light beam spot 10a and exists in a temperature range between temperatures represented by the isothermal lines 102 and 103, are transferred to the reproduction layer 3 and reproduced by the light beam 10. Accordingly, the data in each recording magnetic domain 101 can be reproduced by the light beam 10 in a stable and secured manner even when the recording density of the record layer 4 is enhanced to an extent such that realizes an apparatus with a sufficiently large capacity for recording and reproducing image data.

When three recording magnetic domains 101 having different lengths as shown in FIG. 3(a) are sequentially reproduced from the magneto-optical disk 400, the wave form of the resulting reproduction signal has abrupt rise and fall as shown in FIG. 3(c).

That is to say, like the magneto-optical disk 200, a reproduction signal whose wave form is rectangular having abrupt rise and fall is reproduced from the magneto-optical disk 400 by controlling the reproduction characteristics using the reproduction layer 3 and auxiliary reproduction layer 8. As a result, the position data can be detected more precisely compared with the conventional magneto-optical disk and the data can be recorded and reproduced at a higher density required to record the image data.

Further, since the magneto-optical disk 400 includes the intermediate layer 16 made of a perpendicular magnetization film having the lower Curie temperature than those of the record layer 4 and auxiliary magnetization layer 8 instead of the non-magnetic intermediate layer 9, there occurs magnetic exchange coupling between the record layer 4 and auxiliary reproduction layer 8 at room temperature. Thus, like the magneto-optical disk 300, the magnetization data of the record layer 4 are transferred to the auxiliary reproduction layer 8 more satisfactorily at room temperature compared with the magneto-optical disk 200. As a result, the magnetic domain corresponding to the recording magnetic domain 101 can develop and vanish (collapse) in the reproduction layer 3 in a more secured manner.

Next, an example producing method of the magneto-optical disk 400 will be explained.

Processes ① through ④ are carried out in the same manner as the first embodiment within a sputter device having an Al target, first and second GdFeCo alloy targets, first and second DyFeCo alloy targets to form the transparent dielectric layer 2, reproduction layer 3, nonmagnetic intermediate layer 7, and auxiliary reproduction layer 8 which are sequentially layered on the substrate 1. The reproduction layer 3 has the same composition as their counterparts in the magneto-optical disk 200, and each layer is of the same thickness as their respective counterparts of the magneto-optical disk 200. However, the composition of the auxiliary reproduction layer 8 is $Gd_{0.31}(Fe_{0.66}Co_{0.34})_{0.69}$ herein.

Next, power is supplied to the first GdFeCo alloy target under a gas pressure of $4\times10^{-3}$ Torr to form the intermediate layer 16 made of $Dy_{0.23}(Fe_{0.92}Co_{0.08})_{0.77}$ on the auxiliary reproduction layer 8. The intermediate layer 16 is a perpendicular magnetization film having the compensation temperature and Curie temperature at about room temperature and 170° C., respectively. The intermediate layer 16 must be of a thickness such that enables the magnetic exchange coupling between the record layer 4 and auxiliary reproduction layer 8 at room temperature and the collapse of the reversed magnetic domain in the auxiliary reproduction layer 8 as the temperature rises. Thus, an intermediate layer 16 of 3 nm or more thick is preferable to prevent direct exchange coupling between the record layer 4 and auxiliary reproduction layer 8. Also, if the intermediate layer 16 is thick more than necessary, the light beam 10 demands greater power to raise a temperature, which causes the degradation of recording sensitivity. Thus, it is also preferable for the intermediate layer 16 to have the thickness of 100 nm or less. The intermediate layer 16 of the present embodiment is 20 nm thick.

Next, Processes ⑥ through ⑧ are carried out in the same manner as the first embodiment to form the record layer 4, protective layer 5, and overcoat layer 6 sequentially on the intermediate layer 16. The record layer 4 has the same composition as its counterpart of the magneto-optical disk 200, and each layer has the same thickness as their respective counterparts in the magneto-optical disk 200.

The dependency of the stable magnetic domain width in the reproduction layer 3 and auxiliary reproduction layer 8 on temperature were examined and the results of which were substantially the same as those obtained from the magneto-optical disk 200. Judging from FIGS. 5 and 7, it is understood that the reproduction layer 3, in which a magnetic domain of 0.3 μm wide can exist stably in a temperature range between 100° C. and 200° C. inclusive, can be produced.

Next, the record and reproduction characteristics of the magneto-optical disk 400 were examined in the same manner as the magneto-optical disk 200, and the results of which were substantially the same as those shown in FIG. 8. In other words, both the disks exhibit substantially the same dependency of CNR on the mark length. Note that the magneto-optical disk 400, in which the magnetic exchange coupling between the reproduction layer 3, auxiliary reproduction layer 8, and record layer 4 is controlled not to exist around the Curie temperature of the record layer 4, demands a considerably large recording magnetic field compared with the magneto-optical disk 200; however, the data could be recorded in a recording magnetic field as low as 15 kA/m.

Further, the wave form of a reproduction signal from the magnetic domain having the mark length of 0.3 μm and a 0.6 μm mark pitch in the magneto-optical disk 400 is substantially the same as the wave form of the magneto-optical disk 200 shown in FIG. 9, namely, the characteristic rectangular wave form.

The dependency of CNR on the reproduction power was also examined, and the results of which are substantially the same as those shown in FIG. 10 of the magneto-optical disk 200. That is to say, the CNR increases abruptly at some reproduction power.

The dependency on the film thickness of the magneto-optical disk 400 was examined in the same manner as the magneto-optical disk 200 using some sample disks each comprising the reproduction layer 3, non-magnetic intermediate layer 7, auxiliary reproduction layer 8, intermediate layer 16, and record layer 4 having their respective thicknesses, and the results of which are substantially the same as those of the magneto-optical disk 200 except the intermediate layer 16. Any intermediate layer 16 will do as long as it causes satisfactory exchange coupling between the auxiliary reproduction layer 8 and record layer 4 at room temperature, and eliminates the exchange coupling at or above the Curie temperature of the intermediate layer 16.

The same results were obtained as to the examination on the composition of the reproduction layer 3 and auxiliary reproduction layer 8 as the magneto-optical disk 200. As has been explained, the intermediate layer 16 is composed in such a manner that it has the Curie temperature lower than those of the auxiliary reproduction layer 8 and record layer 4, namely, in a range between 100° C. and 250° C. inclusive.

The same can be said with the magneto-optical disk 400 and magneto-optical disk 200 as to the materials of the transparent dielectric layer 2, reproduction layer 3, nonmagnetic intermediate layer 7, and the record layer 4. Also, the intermediate layer 16 herein is made of DyFeCo; however, the intermediate layer 16 may be made of any material having the Curie temperature lower than those of the auxiliary reproduction layer 8 and record layer 4, for example, GdFe, GdDyCo, GdDyFeCo, and the like.

[FOURTH EMBODIMENT]

Referring to FIGS. 15 through 23, the following description will describe another example embodiment in accordance with the present invention. Hereinafter, like components are labeled with like reference numerals with respect to the above embodiments, and the description of these components is not repeated for the explanation's convenience.

The present embodiment describes the initialization of the reproduction layer 3 when reproducing the data recorded in the record layer 4 of the magneto-optical disks 200, 300, and 400 of the first, second, third embodiments, respectively.

As respectively shown in FIGS. 1(a) through 1(d), 12(a) through 12(d), and 14(a) through 14(d), the reproduction layer 3 of each of the magneto-optical disks 200, 300 and 400 must have homogeneous magnetization direction where no light beam 10 is irradiated.

The reason why is as follows. If the stable magnetic domain width in the reproduction layer 3 at room temperature is extremely narrow, the magnetization of the post-reproduction layer 3 causes magneto-static coupling between the auxiliary reproduction layer 8 and record layer 4. Thus, the magnetization state of the record layer 4 is transferred intactly to the reproduction layer 3, thereby making it impossible to obtain desired reproduction characteristics.

The MSR can be realized in a more stable manner by aligning the magnetization direction of the reproduction layer 3 alone in a specific direction by initializing the reproduction layer 3. In addition, initializing the reproduction layer 3 can extend the composition range of the reproduction layer 3 that can realize the MSR.

The magnetization direction of the reproduction layer 3 can be aligned by any of the following methods: (1) applying an initializing magnetic field; (2) using a reproduction magnetic field; and (3) using floating magnetic fields developed from the auxiliary reproduction layer 8, each of which will be explained below.

Figure 15A:
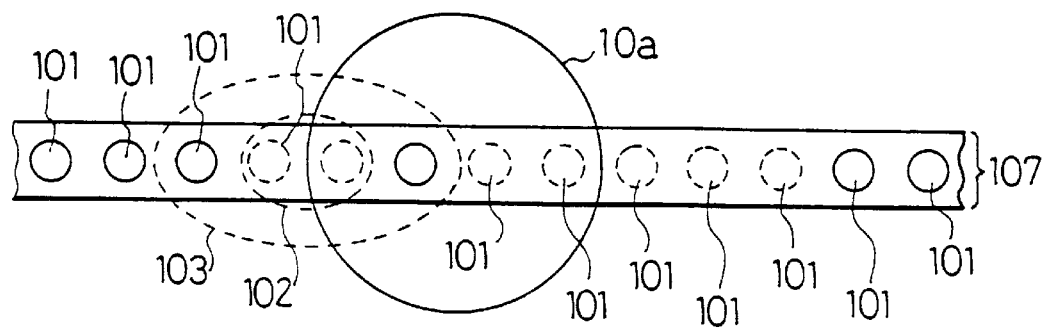
FIGS. 15(a) and 15(b) are views explaining a reproduction method of a magneto-optical recording medium in accordance with still another embodiment of the present invention.
Figure 15B:
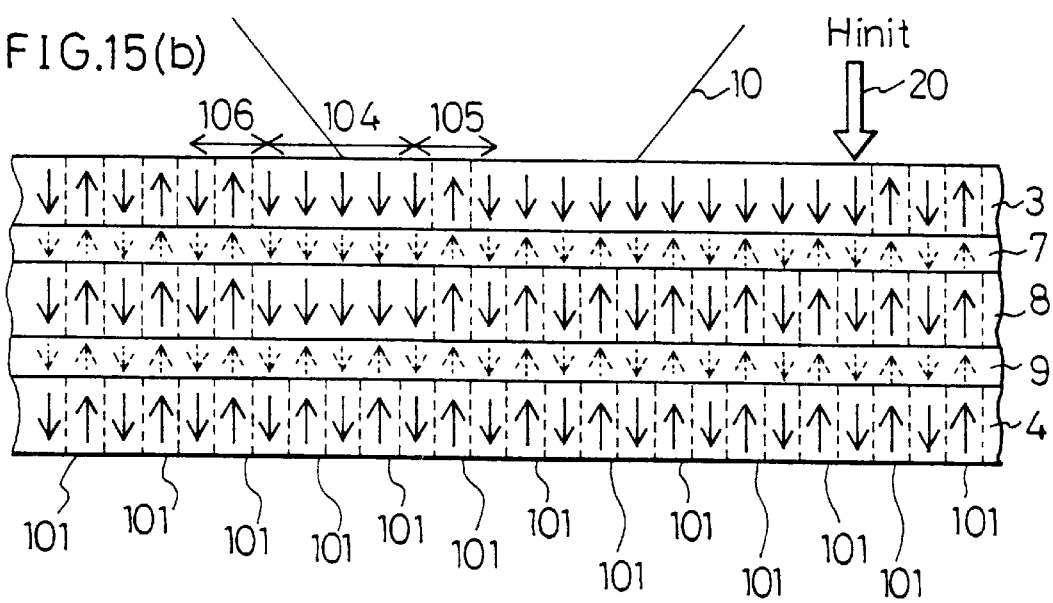

In the first method of applying an initializing magnetic field, the reproduction layer 3 is initialized by being applied an initializing magnetic field ($H_{init}$) 20 prior to the reproduction in the preceding step of irradiating the light beam 10 as shown in FIGS. 15(a) and 15(b). The magnetization direction of the auxiliary reproduction layer 8 at room temperature and in a reproduction temperature range (100° C.–200° C.) must match with the magnetization direction of the floating magnetic fields developed from the record layer 4 in case of the magneto-optical disk 200, and with a magnetization direction determined by the magnetic exchange coupling from the record layer 4 in case of the magneto-optical disks 300 and 400. Therefore, the initializing magnetic field 20 must have power such that aligns the magnetization direction of the reproduction layer 3 alone to the magnetization direction of the initializing magnetic field while leaving the magnetization direction of the auxiliary reproduction layer 8 intact. Note that FIGS. 15(a) and 15(b) shows an example initialization of the magneto-optical disk 200.

In the second method of using a reproduction magnetic field, the reproduction layer 3 is initialized by applying a reproduction magnetic field 21 to an area where irradiated by the light beam 10 on the reproduction layer 3 using reproduction magnetic field generating means 22 as shown in FIGS. 16(a) and 16(b).

Like the first method of applying the initializing magnetic field 20 as shown in FIG. 15(b), the magnetization direction of the auxiliary reproduction layer 8 at room temperature and in a reproduction temperature range (100° C.–200° C.) must match with the magnetization direction of the floating magnetic field developed by the record layer 4 in case of the magneto-optical disk 200, and with a magnetization direction determined by the magnetic exchange coupling with the record layer 4 in case of the magneto-optical disks 300 and 400. The initializing magnetic field 21 must have power such that aligns the magnetization direction of the reproduction layer 3 alone to the magnetization direction of the initializing magnetic field while leaving the magnetization direction of the auxiliary reproduction layer 8 intact. Note that FIGS. 16(a) and 16(b) also show an example initialization using the magneto-optical disk 200.

The reproduction magnetic field generating means 22 can also serve as means for generating the recording magnetic field, and in such a case, the above-explained effects can be realized with increasing neither the size nor the manufacturing costs of the apparatus.

Figure 17:
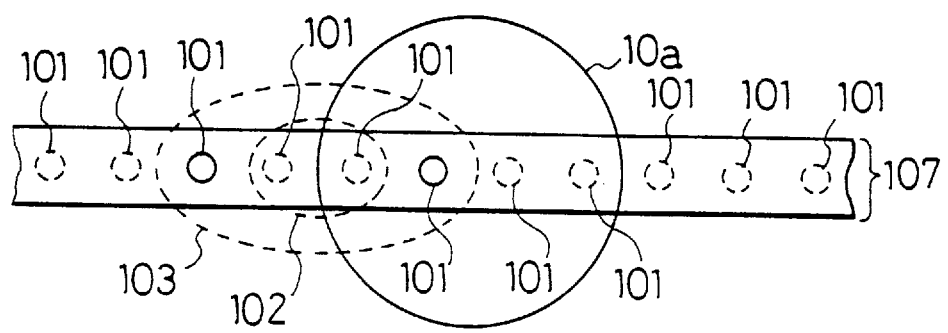
FIGS. 17(a) and 17(b) are views explaining a further reproduction method of a magneto-optical recording medium.
Figure 17B:
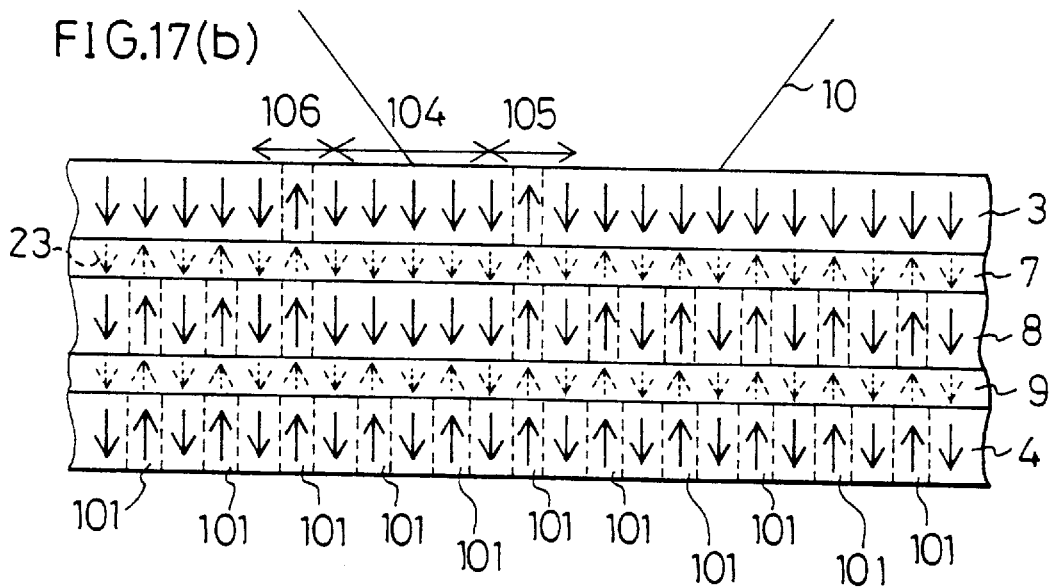

In the third method of applying a floating magnetic field 23, the reproduction layer 3 is initialized by making the width of intervals (non-recording portion) between the recording magnetic domains 101 in the record layer 4 relatively long with respect to the width of the recording magnetic domain 101 using a floating magnetic field 23 developed from the auxiliary reproduction layer 8 as shown in FIGS. 17(a) and 17(b). Accordingly, the floating magnetic field 23 having the same magnetization direction as the recorded magnetization direction develops from the auxiliary reproduction layer 8. However, since the stable magnetic domain width in the reproduction layer 3 is longer than the recording magnetic domain width at room temperature, the magnetization direction of the reproduction layer 3 is aligned to a relative magnetization direction in which the floating magnetic field 23 grows, that is to say, non-recording portions, other than the reproduction temperature area, thereby initializing the reproduction layer 3. Note that FIGS. 17(a) and 17(b) also show an example initialization using the magneto-optical disk 200.

Figure 18A:
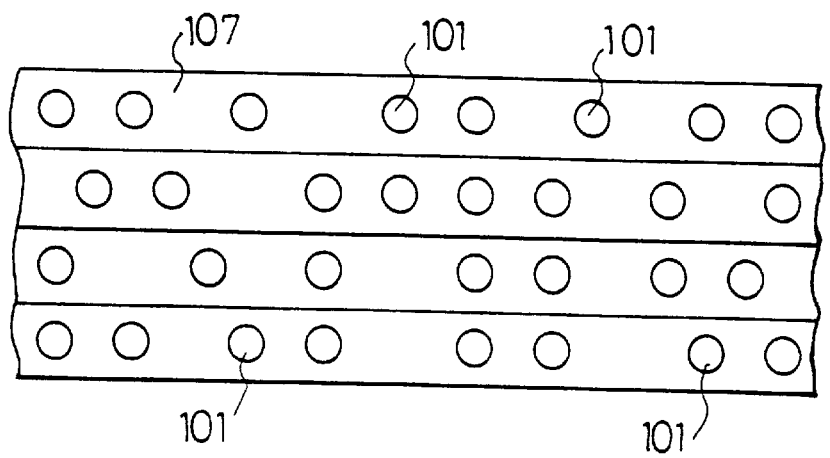
FIGS. 18(a) and 18(b) are views explaining a recording method of the mangeto-optical recording medium enabling the reproduction method of FIGS. 17(a) and 17(b)
Figure 18B:
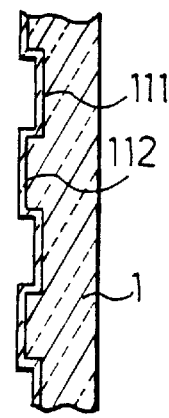

A mark position recording method is preferable in making the area of the non-recording portion relatively larger than that of the recording portion in the record layer 4 to use the floating magnetic field of the auxiliary reproduction layer 8 in initialization. In the mark position recording method, the position of the recording magnetic domain 101 on a track 107 in both a groove section 111 and a land section 112 as shown in FIGS. 18(a) and 18(b) represents the data.

Figure 19A:
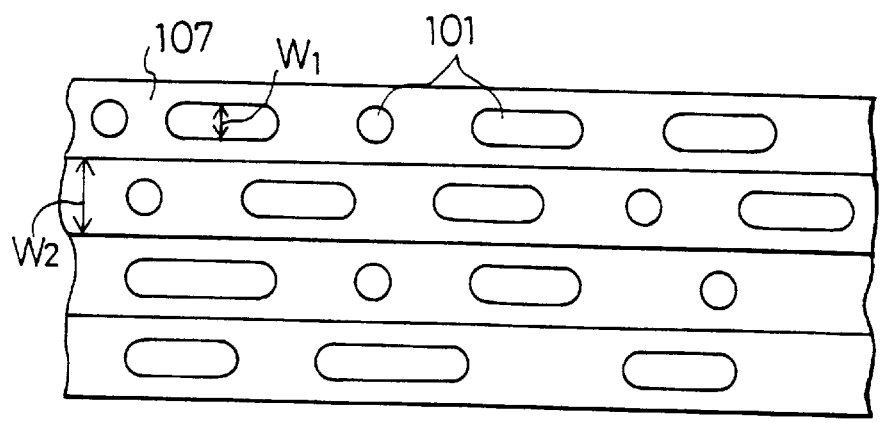
FIGS. 19(a) and 19(b) are views explaining another recording method of the mangeto-optical recording medium enabling the reproduction method of FIGS. 17(a) and 17(b)
Figure 19B:
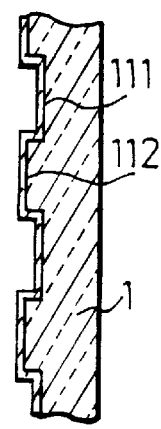

Alternatively, the area of the non-recording portion can be enlarged relatively with respect to the recording portion by another mark edge recording method. In the mark edge recording method, the lengths of the recording magnetic domains 101 as shown in FIGS. 19(a) and 19(b) represent the data, and a width $W_1$ of the recording magnetic domain 101 is made shorter than a width $W_2$ of the track 107.

Figure 21:
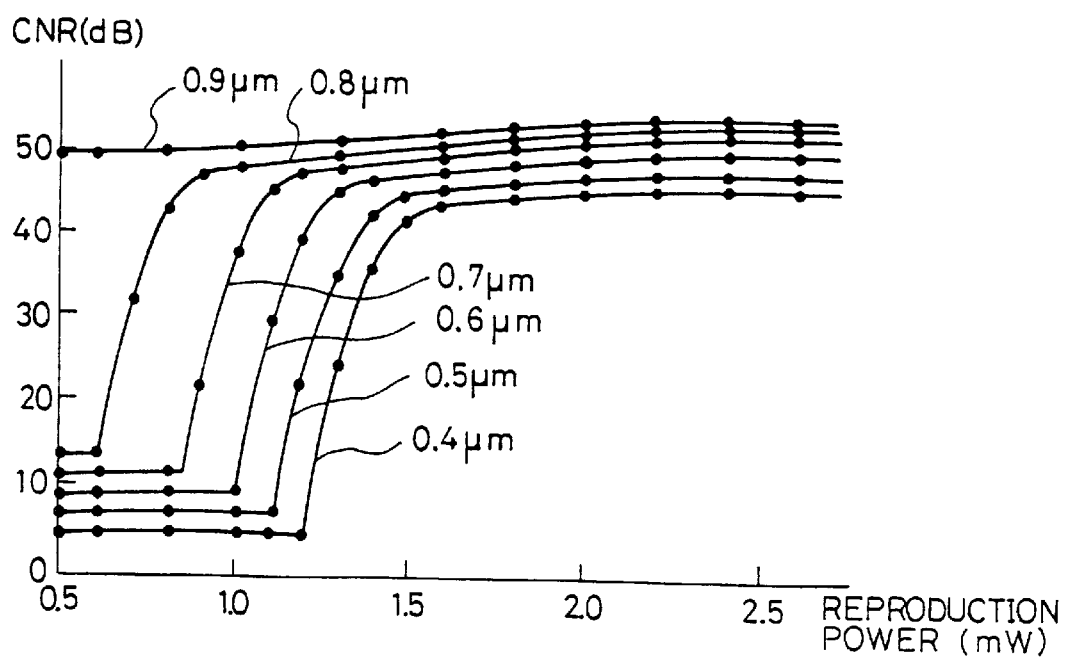
FIG. 21 is a graph showing the dependency of CNR on a reproduction power in the recording method of FIGS. 20(a) and 20(b)

The width of the recording magnetic domain 101 capable of initializing the reproduction layer 3 using the floating magnetic field 23 from the record layer 4, that is to say, capable of enlarging the area of the non-recording portion relatively with respect to the recording portion, was examined with the magneto-optical disk 200 using the mark edge recording method in which the data are recorded in the land section 112 alone, the results of which are set forth in FIG. 21.

Figure 20A:
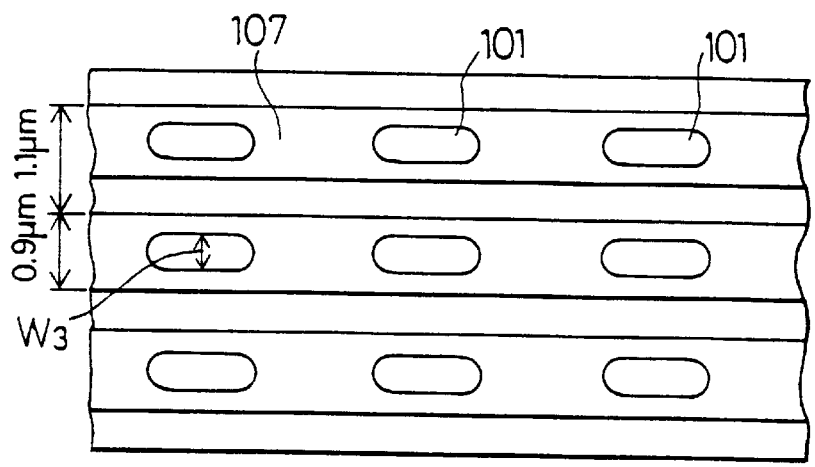
FIGS. 20(a) and 20(b) are views explaining a further recording method of the mangeto-optical recording medium enabling the reproduction method of FIGS. 17(a) and 17(b)
Figure 20B:
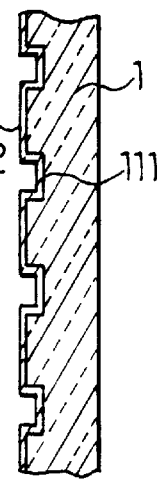

As shown in FIGS. 20(a) and 20(b), the substrates 1 has the land section 112 of 0.9 $\mu$m wide and a 1.1 $\mu$m pitch, and the CNR was measured after the recording magnetic domains 101 having their respective widths $W_3$ were formed in the land section 112 to examine the dependency of CNR on reproduction power.

FIG. 21 indicates that no increase in CNR was acknowledged in response to the increase in the reproduction power when the recording magnetic domain width $W_3$ is 0.9 $\mu$m. This indicates the data are transferred from the record layer 4 to the reproduction layer 3 at room temperature. Thus, the MSR can not be realized by initializing the reproduction layer 3 using the floating magnetic field 23 from the record layer 4.

As the recording magnetic domain width $W_3$ is sequentially narrowed to 0.8 $\mu$m, 0.7 $\mu$m, 0.6 $\mu$m, 0.5 $\mu$m and 0.4 $\mu$m, the CNR increases as the reproduction power does so. This indicates that the MSR can be realized by initializing the reproduction layer 3 using the floating magnetic field 23 from the record layer 4.

In other words, to realize the MSR through initialization of the reproduction layer 3 using the floating magnetic domain 23 from the record layer 4, the recording magnetic domain width is made shorter than the track 107, namely, the land section 112.

Next, the width of the recording magnetic domain 101 capable of realizing the MSR through initialization of the reproduction layer 3 using the floating magnetic field 23 from the record layer 4 was examined with the magneto-optical disk 200 using the mark edge recording method in which data are recorded both in land and groove recording sections, the results of which are set forth in FIG. 23.

As shown in FIGS. 22(a) and 22(b), the substrate 1 includes the land section 112 of 0.7 $\mu$m wide and a 1.4 $\mu$m pitch, and the groove section 111 sandwiched by the land section 112. The dependency of CNR on reproduction power was measured after a plurality of recording magnetic domains 101 having their respective widths $W_4$ were formed in the land section 112 and groove section 111.

FIG. 23 reveals that no increase of the CNR is acknowledged in response to the increase in temperature when the width $W_4$ of the recording magnetic domain is 0.6 μm. This indicates that the data are transferred from the record layer 4 to the reproduction layer 3 at room temperature, and therefore, the MSR can not be realized by initializing the reproduction layer 3 using the floating magnetic field 23 from the record layer 4.

On the other hand, as the width $W_4$ is narrowed to 0.5 μm to 0.4 μm to 0.3 μm, an increase of CNR is acknowledged as the reproduction power increases. This indicates that the MSR can be realized by initializing the reproduction layer 3 using the floating magnetic field 23 from the record layer 4. In other words, to realize the MSR by initializing the reproduction layer 3 using the floating magnetic field 23 from the record layer 4, the width of the recording magnetic domain 101 is made shorter than the width of the track 107, namely, the width of the land section 112 or groove section 111.

[FIFTH EMBODIMENT]

Referring to FIGS. 24 through 28, the following description will describe another example embodiment in accordance with the present invention. Hereinafter, like components are labeled with like reference numerals with respect to the above embodiments, and the description of these components is not repeated for the explanation's convenience.

The present embodiment describes an example processing of the wave form of reproduction signals from the magneto-optical disks 200, 300, and 400 of the first, second, and third embodiments, respectively.

Figure 24:
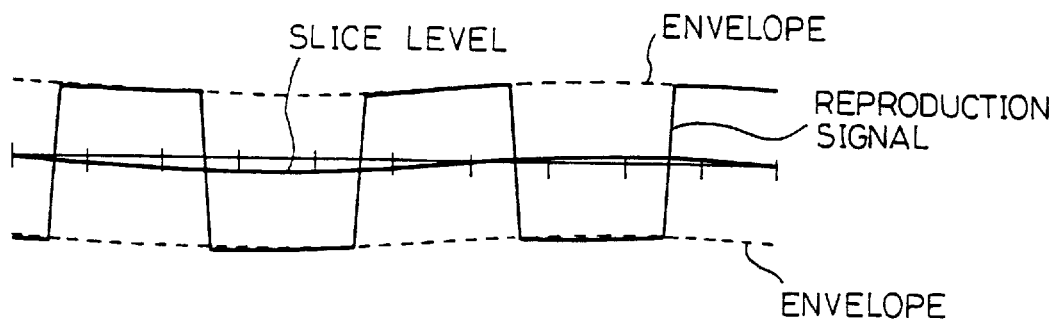
FIG. 24 is a view explaining still another example embodiment of the present invention and shows wave forms of reproduction signals reproduced from the magneto-optical recording media of FIGS. 1(a) through 1(d), 11, and 13, respectively.

As has been explained, the wave form of a reproduction signal detected from the magneto-optical disk 200 (300 or 400) has abrupt rise and fall. For example, when the data are recorded in the magneto-optical disk 200 (300 or 400) using the recording magnetic domains 101 having a diameter of 0.4 μm and a 0.8 μm pitch by the land groove recording method shown in FIGS. 22(a) and 22(b), the wave form as shown in FIG. 24 is obtained as the wave form of the resulting reproduction signal.

Figure 25:
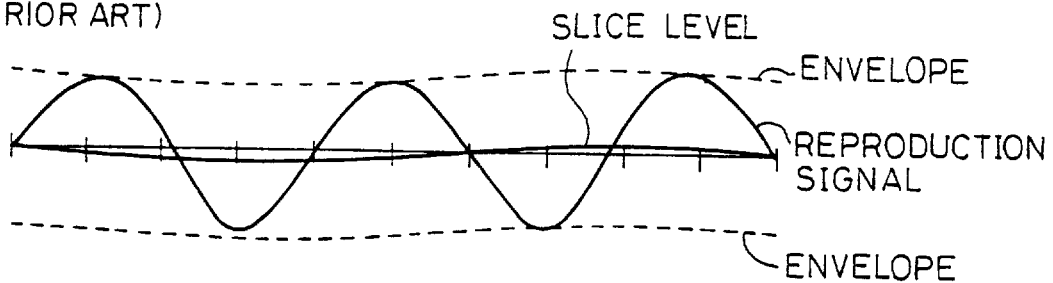
FIG. 25 shows a wave form of a reproduction signal reproduced from a conventional magneto-optical recording medium.

In contrast, a reproduction signal is produced from a conventional single-layer magneto-optical disk as the recording magnetic domain within the light beam spot moves as the light beam does so, and the wave form of the resulting reproduction signal is an approximate sine curve as shown in FIG. 25.

A differential detecting method is used for the magneto-optical disk in general. Although the differential detecting method can curb the changes in amplitude of the resulting reproduction signal caused by the change in refractive index to some extent, but can not curb those caused by the variance in birefringence and the like. Thus, the wave form of the reproduction signal shows gradual rise and fall as shown in FIG. 25. Such gradual rise and fall cause unreliable detection of the position of the recording magnetic domain 101 when setting the slice level at a constant voltage level.

Figure 27:
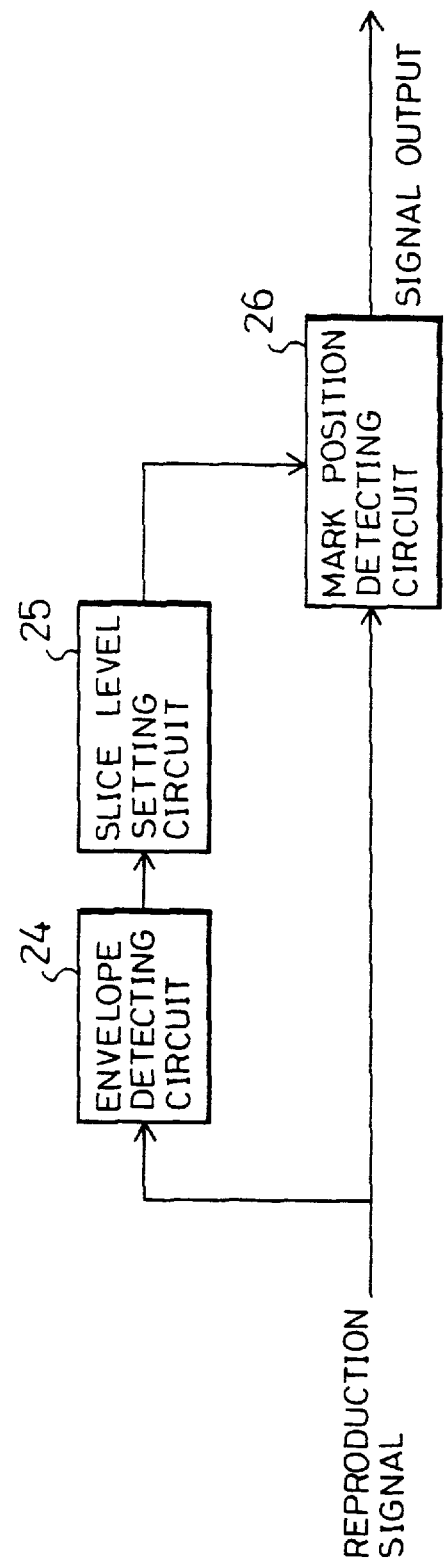
FIG. 27 is a block diagram of a processing circuit for correcting the reproduction signal reproduced from the conventional magneto-optical recording medium.

Thus, to reduce the reproduction error caused by the above gradual rise and fall, a final signal is produced by an envelope detection shown in FIG. 27. More specifically, each envelope of the reproduction signal is detected by an envelope detecting circuit 24 and a slice level is set by a slice level setting circuit 25 based on the average level of the detected envelopes. As a result, the variance in the detected position of the recording magnetic domain 101, caused by the gradual rise and fall, can be reduced and the position can be detected precisely by a mark position detecting circuit 26.

The reproduction signal shown in FIG. 24 of the magneto-optical disk 200 (300 or 400) has gradual rise and fall of the amplitude as well. However, since the reproduction signal has abrupt rise and fall compared with the conventional example shown in FIG. 25, the position of the recording magnetic domain 101 can be detected more precisely by setting the slice level at the constant voltage compared with the conventional detection. Nevertheless, it is preferable to produce a final signal as well by detecting the envelopes of the reproduction signal like the case shown in FIG. 25.

Note that, however, when the reproduction signal is processed through the envelope detection, the reproduction signal must be delayed due to the latency caused by such envelope detection using a schematic circuit diagram shown in FIG. 27. This complicates the circuit and causes trouble in synchronizing the slice level by the envelope detection and the reproduction signal.

Figure 26:
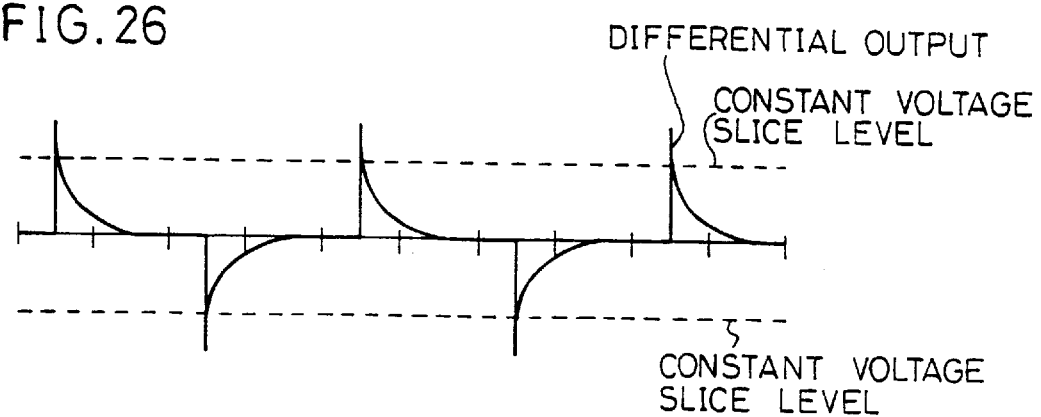
FIG. 26 shows a wave form of a differentiated reproduction signal of FIG. 24.
Figure 28:
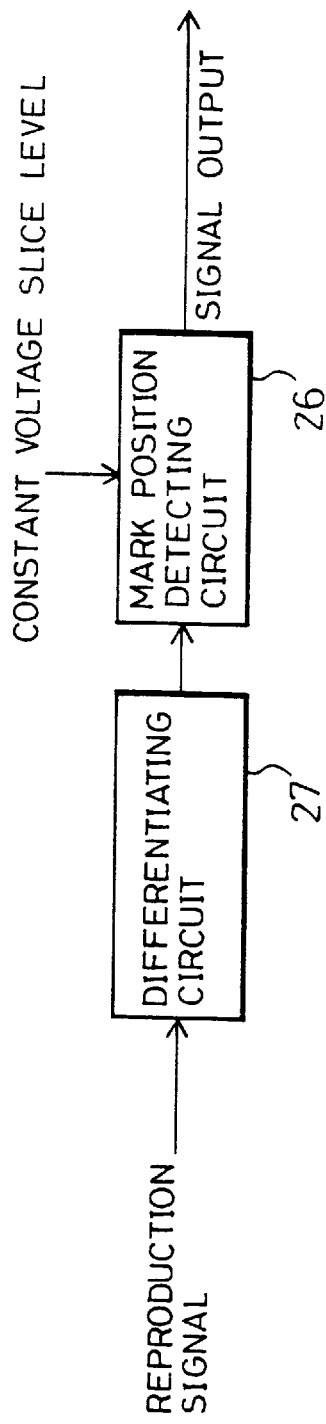
FIG. 28 is a block diagram of a processing circuit for correcting a reproduction signal to have the wave form shown in FIG. 26.

To eliminate the above problem, a final signal is produced by differentiating the reproduction signal from the magneto-optical disk 200 (300 or 400) in the present embodiment. As shown in FIG. 26, since the reproduction signal from the magneto-optical disk 200 (300 or 400) has abrupt rise and fall, the gradual change in the amplitude of the reproduction signal can be eliminated by differentiation, thereby making it possible to obtain a differential output of a portion corresponding to the abrupt change, namely, the rise and fall. As has been explained, the adverse effect of the gradual rise and fall of a signal amplitude can be eliminated by differentiating the resulting reproduction signal with the magneto-optical disk 200 (300 or 400), and a final reproduction signal can indicate the precise position of the recording magnetic domain 101. As a result, a reproduction signal can be processed in a precise manner with a simple circuit using a differentiating circuit: 27 and a constant voltage slice level as shown in FIG. 28.

When a reproduction signal shows a conventional sine curve as shown in FIG. 25, differentiation only causes the change in phase and hardly causes a drastic change to the wave form of the reproduction signal.

Further, since the reproduction signal from the magneto-optical disk 200 (300 or 400) has abrupt rise and fall, the position of the rise and fall can be detected precisely, and satisfactory reproduction characteristics can be obtained with the mark edge recording method shown in FIGS. 19(a) and 19(b). For example, the precise positions of the rise and fall of the signal can be detected separately using two kinds of constant voltage levels as slice levels as shown in FIG. 26. In addition, differentiating the differential output in FIG. 26 makes it possible to detect the positions of rise and fall of the signal precisely at the same time using a single constat voltage as a slice level.

As has been explained, data of the precise position of the edges of the recording magnetic domain 101 can be obtained by differentiating the reproduction signal. Thus, the signal standard required in reproducing a signal can be lowered.

In other words, it has been impossible to satisfy an error rate required for a magneto-optical disk, namely, $1 \times 10^{-5}$, if the signal quality is 45 dB or less in CNR. However, an error rate $1 \times 10^{-5}$ or less can be realized in the present invention if the pre-process signal has a quality of 35 dB or more.

As has been explained, an error rate sufficiently small for a magneto-optical disk can be realized even with a smaller recording magnetic domain 101 whose signal quality is about 35 dB, thereby enabling high-density record and reproduction.

TABLE 3 shows experiment data indicating the realization of high-density recording and reproduction mentioned above. In the comparative example, CNR1·Er (error rate) 1 is the result with respect to a reproduction signal of the conventional magneto-optical disk shown in FIG. 25, CNR2·Er2 shows the result with respect to the reproduction signal of the present embodiment from the magneto-optical disk 200 (300 or 400) as shown in FIG. 24. Also, as shown in FIG. 26, Er3 shows the result of differentiating process of the reproduction signal shown in FIG. 24.

TABLE 3

| BIT LENGTH ($\mu$m) | COMPARATIVE EXAMPLES | | EXAMPLES | | |
|---|---|---|---|---|---|
| | CNR1 (dB) | Er1 ($\times 10^{-5}$) | CNR2 (dB) | Er2 ($\times 10^{-5}$) | Er3 ($\times 10^{-5}$) |
| 0.8 | 48 | 0.3 | 49 | 0.2 | 0.1 |
| 0.6 | 45 | 0.4 | 47 | 0.3 | 0.1 |
| 0.5 | 43 | 1.3 | 48 | 0.4 | 0.2 |
| 0.4 | 39 | 5.4 | 47 | 0.3 | 0.2 |
| 0.35 | — | — | 41 | 1.2 | 0.4 |
| 0.3 | — | — | 39 | 5.6 | 0.8 |
| 0.25 | — | — | 24 | 17.0 | 4.8 |

TABLE 3 reveals that in case of CNR1 of the comparative example, the shortest bit length to realize the desired error rate ($1 \times 10^{-5}$) is 0.6 $\mu$m as shown in Er1 column; however, in case of CNR2 of the example of the present invention, the shortest bit length to realize the desired error rate is reduced to 0.4 $\mu$m as shown in Er2 column even no differentiating process is applied to the reproduction signal, thereby enhancing the density compared with the conventional examples. Moreover, when the reproduction signal is differentiated, the shortest bit length to realize the desired error rate is reduced to as short as 0.3 $\mu$m as shown in Er3 column, thereby further enhancing the density.

[SIXTH EMBODIMENT]

Referring to FIGS. 29 through 31, the following description will describe another example embodiment in accordance with the present invention. Hereinafter, like components are labeled with like reference numerals with respect to the above embodiments, and the description of these components is not repeated for the explanation's convenience.

The present embodiment describes example modulating methods of the recording magnetic domain in the magneto-optical disk 200, 300, and 400 of the first, second, and third embodiments, respectively.

To begin with, a first modulating method will be described with reference to FIGS. 29(a) through 29(d). FIG. 29(a) is a plan view showing a state where three kinds of recording magnetic domains 101 (a1 through a3) having their respective sizes are formed on the magneto-optical disk 200 (300 or 400). FIG. 29(b) is a cross sectional view of FIG. 29(a). FIG. 29(c) shows a synchronous signal 120 corresponding to the recording magnetic domains 101 (a1 through a3). FIG. 29(d) shows a reproduction signal 121 reproduced from the recording magnetic domains 101 (a1 through a3) on the track 107, the second from the top, for example.

Here, the data are recorded in both the land section 112 and groove section 111. The track 107 is 0.7 $\mu$m wide and the diameters of the recording magnetic domains 101, namely, a1, a2, and a3, are 0.4 $\mu$m, 0.5 $\mu$m, and 0.6 $\mu$m, respectively.

Data recorded into the magneto-optical disk 200 as recording magnetic domains 101 are reproduced along the track 107 by driving a semi-conductor laser for irradiating a laser beam at a driving voltage modulated in accordance with the record data. In the first modulating method, recording magnetic domains 101 having their respective sizes corresponding to the data are produced in the same pitches in sync with a synchronous signal 120, and the data are reproduced from the recording magnetic domains 101 by detecting the sizes thereof.

Conventionally, it was difficult to detect the recording magnetic domains 101 (a1 through a3) having a diameter of 0.6 $\mu$m or less separately in a precise manner. Thus, as shown in FIGS. 19(a) and 19(b), digital data are reproduced in most of the cases by detecting the lengths of the digitally modulated recording magnetic domains 101. For example, when the data are recorded and reproduced using a 680 nm wavelength semiconductor laser beam, the length of the shortest recording magnetic domain is 0.64 $\mu$m. That is to say, the recording magnetic domains having a diameter of 0.64 $\mu$m or less can not be detected separately in a precise manner with a conventional magneto-optical disk. Thus, the data must be recorded using the recording magnetic domains 101 of 0.64 $\mu$m long as shown in FIGS. 19(a) and 19(b).

In contrast, a reproduction signal from the magneto-optical disk 200 (300 or 400) has a rectangular wave form with abrupt rise and fall as shown in FIG. 29(d). Thus, even if the recording magnetic domains 101 has a diameter of 0.64 $\mu$m or less, the wave form of a reproduction signal reflects the size of each recording magnetic domain, thereby enabling the reproduction of the digital data. That is to say, a reproduction time a11 for the smaller recording magnetic domain a1 is short, and a reproduction signal having a small reproduction output a12 is produced. Whereas reproduction time a31 for a larger recording magnetic domain a3 is long, and a reproduction signal having a large reproduction output a32 is produced.

In short, using the magneto-optical disk 200 (300 or 400) enables not only high-density recording using the recording magnetic domains 101 having a diameter of 0.64 $\mu$m or less, but also precise reproduction. Although the data, namely the size of the recording magnetic domains 101, can be detected by detecting the amplitude of the reproduction output (a12, a22, and a32) of the wave form of the reproduction signal, and the data can be detected more precisely by detecting the reproduction time width (a11, a21, and a31) using the abrupt rise and fall. Three recording magnetic domains -recording magnetic domain a1 ($\phi$ 0.4 $\mu$m), recording magnetic domain a2 ($\phi$ 0.5 $\mu$m), and recording magnetic domain a3 ($\phi$0.6 $\mu$m)- are used as examples; however, the data can be recorded into five recording magnetic domains having their respective diameters in narrower intervals: ($\phi$ 0.4 $\mu$m), ($\phi$ 0.45 $\mu$m), ($\phi$ 0.5 $\mu$m), ($\phi$ 0.55 $\mu$m), and ($\phi$ 0.6 $\mu$m).

Next, a second modulating method will be described with reference to FIGS. 30(a) through 30(e). FIG. 30(a) is a plan view showing a state where three kinds of recording magnetic domains 101 (a1 through a3) having their respective sizes are formed on the magneto-optical disk 200 (300 or 400). FIG. 30(b) is a cross sectional view of FIG. 30(a). FIG. 30(c) shows a synchronous signal 120 corresponding to the recording magnetic domains 101 (a1 through a3). FIG. 30(d) shows a reproduction signal 121 reproduced from the recording magnetic domains 101 (a1 through a3) on the track 107, the second from the top, for example. FIG. 30(e)

shows a signal indicating positions 122 of the recording magnetic domains 101 (a1 through a3) obtained from a reproduction signal.

Here, the data are recorded in both the land section 112 and groove section 111 in the same manner as the first modulating method. The track 107 is 0.7 μm wide, and the diameters of the recording magnetic domains 101, namely, a1, a2, and a3 are 0.4 μm, 0.5 μm, and 0.6 μm. respectively.

The second modulating method is different from the first modulating method in the following points. That is to say, according to the first modulating method, the recording magnetic domains 101 (a1 through a3) are recorded in regular pitches in sync with the synchronous signal 120. In contrast, according to the second modulating method, the data are represented by the size and recording position of each recording magnetic domain 101. As a result, the data can be recorded or reproduced in a higher density. In other words, the digital data corresponding to the size of the recording magnetic domain 101 are reproduced in the form of digital data cut of the reproduction signal 121 shown in FIG. 29(d), and the position 122 shown in FIG. 29(e) indicating the position of the recording magnetic domain 101 produced out of the reproduction signal 121 is reproduced in the form of digital data. As a result, the digital data corresponding to the size and position of each recording magnetic domain 101 can be recorded or reproduced separately. Alternatively, the recording magnetic domains 101 may be of the same size and only the position data of each recording magnetic domain 101 may be varied in accordance with the data, and the data may be reproduced in accordance with the recording position.

Since the reproduction time differs in response to the size of the recording magnetic domain 101, when detecting the position 122 of the recording magnetic domain 101, it is preferable to detect the recording magnetic domain 101 by finding the mid-point between the rise and fall of the wave form of the reproduction signal to detect the position 122 of the recording magnetic domain 101 precisely.

The position 122 of the recording magnetic domain 101 thus detected is compared with a position 120' of the synchronous signal, which makes it possible to reproduce the digital data corresponding to the position 122 of the recording magnetic domain 101.

In FIGS. 30(a) through 30(e), let c1 be a case where the position 122 of the recording magnetic domain 101 is ahead of the position 120' of the synchronous signal in time series, let c2 be a case where the positions 122 and 120' are on the same point, and let c3 be a case where the position 122 is behind the position 120', then three kinds of digital data related to the cases c1, c2, and c3 can be reproduced. Further, setting the positions of the recording magnetic domain 101 at narrower intervals makes it possible to record and reproduce more digital data as to the position of the recording magnetic domain 101.

The reason why the position of the microscopic recording magnetic domain 101 can be detected precisely is the same as the precise detection of the size of the recording magnetic domain 101. More precisely, the reason why is because a reproduction signal having a rectangular wave form with abrupt rise and fall as shown in FIG. 30(d) can be reproduced from the magneto-optical disk 200 (300 or 400) of the present embodiment.

Like the case shown in FIGS. 29(a) through 29(d), dividing the recording magnetic domains 101 into more detailed size groups makes it possible to record and reproduce more digital data as to the size of the recording magnetic domain 101.

Next, a third modulating method will be described with reference to FIGS. 31(a) through 31(e). FIG. 31(a) is a plan view showing a state where three kinds of recording magnetic domains 101 (a1 through a3) having their respective sizes are formed on the magneto-optical disk 200 (300 or 400). FIG. 31(b) is a cross sectional view of FIG. 31(a). FIG. 31(c) shows a synchronous signal 120 corresponding to the recording magnetic domains 101 (a1 through a3). FIG. 31(d) shows a reproduction signal 121 reproduced from the recording magnetic domains 101 (a1 through a3) on the track 107, the second from the top, for example. FIG. 31(e) shows a signal indicating the position 122 of the recording magnetic domain 101 (a1 through a3) produced from the reproduction signal output.

Like the first and second modulating methods, the data are recorded in both the land section 112 and groove section 111. The track 107 is 0.7 μm wide, and the diameters of the recording magnetic domains 101, namely, a1, a2, and a3, are 0.4 μm, 0.5μm, and 0.6μm. respectively.

Like the second modulating method, the third modulating method is different from the first modulating method, which can realize the record and reproduction of higher density digital data. More precisely, according to the first modulating method, the recording magnetic domains 101 (a1 through a3) are recorded in the same pitches in sync with the synchronous signal 120. In contrast, according to the third modulating method, the content of data is represented by the size and recording position of each recording magnetic domain 101. In other words, digital data corresponding to the size of the recording magnetic domain 101 are reproduced from the reproduction signal output 121 shown in FIG. 31(d), while digital data corresponding to the position 122 of the recording magnetic domain 101 are reproduced from the reproduction signal output 121. As a result, the data corresponding to the size and position of the recording magnetic domain 101 can be recorded and reproduced separately.

Since the reproduction time differs depending on the size of the recording magnetic domain 101, when detecting the position 122 of the recording magnetic domain 101, it is preferable to detect the recording magnetic domain 101 by finding the mid-point between the rise and fall of the wave form of the reproduction signal to detect the position 122 of the recording magnetic domain precisely.

Unlike the second modulating method shown in FIGS. 30(a) through 30(e) where the digital data are recorded and reproduced based on a relative relation in position of the position 122 of the recording magnetic domain 101 with respect to the position 120' of the synchronous signal, in the third modulating method, the intervals (b1, b2, and b3) between the positions 122 of the recording magnetic domains 101 are changed depending on the content of the record data, and the data are reproduced in accordance with the above intervals.

Three kinds of digital data b1, b2, and b3 can be reproduced in accordance with the intervals between the positions 122 of the recording magnetic domain 101. Further, setting the positions 122 of the recording magnetic domain 101 at narrower intervals makes it possible to record and reproduce more digital data as to the position of the recording magnetic domain 101.

Also, like the first modulating method shown in FIGS. 29(a) through 29(d), dividing the recording magnetic domains 101 into more detailed size groups makes it possible to record and reproduce more digital data as to the size of the recording magnetic domain 101.

Moreover, the size and position of the magnetic domain can be detected more precisely by applying the above differentiating processing to the first, second, or third modulating method.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A data reproducing apparatus for reproducing data from a magneto-optical disk comprising a record layer, made of a perpendicular magnetization film, for recording data, a reproduction layer where a light beam is irradiated to read out the data, an auxiliary reproduction layer, interposed between said record layer and said reproduction layer, for reflecting the data recorded in said record layer, and an intermediate layer, interposed between said auxiliary reproduction layer and reproduction layer, for weakening a magnetic exchange coupling force between said auxiliary reproduction layer and reproduction layer, each of said reproduction layer and said auxiliary reproduction layer being made of a perpendicular magnetization film in which a width of a magnetic domain existing in a stable manner varies in response to temperatures, said magneto-optical disk satisfying a condition that the width of a magnetic domain existing in a stable manner in said reproduction layer and said auxiliary reproduction layer is not longer than a width of a magnetic domain in said record layer in a specific temperature range, said temperature range corresponding to a temperature distribution within a part of a spot of said light beam, said data reproducing apparatus comprising:

a light source for irradiating the light beam onto said magneto-optical disk;

a differentiating circuit for differentiating a reproduction signal; and a mark detecting circuit for detecting a record mark position using an output of said differentiating circuit.

2. The data reproducing apparatus as defined in claim 1, wherein said mark detecting circuit includes a comparing circuit for comparing an output from said differentiating circuit with a predetermined voltage value.

3. The data reproducing apparatus as defined in claim 1 further comprising a second differentiating circuit for differentiating an output from said differentiating circuit, said second differentiating circuit being provided between said deferential circuit and said mark detecting circuit.

4. The data reproducing apparatus as defined in claim 1, further comprising:

magnetic field applying means for applying an initializing magnetic field to an area ahead of a light beam irradiation area, whereby said area of said reproduction layer is initialized prior to reproduction; and said initializing magnetic field having a strength for initializing only a magnetization direction of said reproduction layer.

5. The data reproducing apparatus as defined in claim 1, further comprising:

magnetic field applying means for applying a reproduction magnetic field to a light beam irradiation area, whereby said light beam irradiation area of said reproduction layer is initialized and said reproduction magnetic field having a strength for initializing only a magnetization direction of said reproduction layer.

6. A method of recording and reproducing data with a magneto-optical recording medium comprising a record layer, made of a perpendicular magnetization film, for recording data, a reproduction layer where a light beam is irradiated to read out the data, an auxiliary reproduction layer, interposed between said record layer and said reproduction layer, for reflecting the data recorded in said record layer, and an intermediate layer, interposed between said auxiliary reproduction layer and reproduction layer, for weakening a magnetic exchange coupling force between said auxiliary reproduction layer and reproduction layer, each of said reproduction layer and said auxiliary reproduction layer being made of a perpendicular magnetization film in which a width of a magnetic domain existing in a stable manner varies in response to temperatures, said magneto-optical recording medium satisfying a condition that the width of a magnetic domain existing in a stable manner in said reproduction layer and said auxiliary reproduction layer is not longer than a width of a magnetic domain in said record layer in a specific temperature range, said temperature range corresponding to a temperature distribution within a part of a spot of said light beam, said method comprising:

a record step of recording record marks each having their respective sizes corresponding to record data at regular pitches; and a reproduction step having sub-steps of:

detecting a size of the record mark using a wave form of a reproduction signal reproduced through irradiation of said light beam; and reproducing data corresponding to the detected size of the record mark.

7. A method of recording and reproducing data with a magneto-optical recording medium comprising a record layer, made of a perpendicular magnetization film, for recording data, a reproduction layer where a light beam is irradiated to read out the data, an auxiliary reproduction layer, interposed between said record layer and said reproduction layer, for reflecting the data recorded in said record layer, and an intermediate layer, interposed between said auxiliary reproduction layer and reproduction layer, for weakening a magnetic exchange coupling force between said auxiliary reproduction layer and reproduction layer, each of said reproduction layer and said auxiliary reproduction layer being made of a perpendicular magnetization film in which a width of a magnetic domain existing in a stable manner varies in response to temperatures, said magneto-optical recording medium satisfying a condition that the width of a magnetic domain existing in a stable manner in said reproduction layer and said auxiliary reproduction layer is not longer than a width of a magnetic domain in said record layer in a specific temperature range, said temperature range corresponding to a temperature distribution within a part of a spot of said light beam, said method comprising:

a record step of recording record marks each having a size and a record position corresponding to record data; and a reproduction step having sub-steps of:

detecting the size and the record position of the record mark using rise and fall of a wave form of reproduction signal reproduced through irradiation of said light beam; and reproducing data corresponding to the detected size and position of the record mark.

* * * * *